(12) United States Patent
Vampa et al.

(10) Patent No.: US 9,746,748 B2
(45) Date of Patent: Aug. 29, 2017

(54) APPARATUS AND METHOD FOR GENERATION OF HIGH HARMONICS FROM SILICON

(71) Applicant: University of Ottawa, Ottawa (CA)

(72) Inventors: Giulio Vampa, Ottawa (CA); Paul B. Corkum, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 0 days.

(21) Appl. No.: 15/337,331

(22) Filed: Oct. 28, 2016

(65) Prior Publication Data

US 2017/0123291 A1 May 4, 2017

Related U.S. Application Data

(60) Provisional application No. 62/248,372, filed on Oct. 30, 2015.

(51) Int. Cl.
| | |
|---|---|
| *G02F 1/35* | (2006.01) |
| *G02F 1/355* | (2006.01) |
| *G02F 1/37* | (2006.01) |
| *G02F 2/02* | (2006.01) |

(52) U.S. Cl.
CPC ............ *G02F 1/353* (2013.01); *G02F 1/3556* (2013.01); *G02F 1/37* (2013.01); *G02F 2001/354* (2013.01); *G02F 2202/104* (2013.01); *G02F 2203/10* (2013.01)

(58) Field of Classification Search
None
See application file for complete search history.

(56) References Cited

U.S. PATENT DOCUMENTS

| 7,664,147 B2 * | 2/2010 | Cohen ................. G02F 1/353 372/22 |
| 8,466,427 B2 * | 6/2013 | Moiseyev ............ B82Y 20/00 250/393 |
| 9,496,681 B2 * | 11/2016 | Vampa ................. H01S 5/042 |
| 2015/0086148 A1 * | 3/2015 | Liu ....................... G02F 1/3544 385/1 |

OTHER PUBLICATIONS

Stewart et al., "Nanostructured plasmonic sensors", Chemical Reviews, vol. 108, pp. 494-521 (2008).
Cingöz et al., "Direct frequency comb spectroscopy in the extreme ultraviolet", Nature, vol. 482, pp. 68-71 (2012).
(Continued)

*Primary Examiner* — Rhonda Peace
(74) *Attorney, Agent, or Firm* — Miles & Stockbridge, P.C.; Ajay A. Jagtiani

(57) ABSTRACT

A method and apparatus is disclosed for generating tunable attosecond-scale radiation pulses, with a frequency in range of mid-infrared to ultra-violet, from a silicon medium. The invention utilizes an intense laser pulse to drive a high harmonic generation (HHG) process in a silicon medium and a weak secondary field to control the HHG process. The weak secondary field has a frequency equal to the second harmonic of the intense laser pulse. The spatial, temporal and spectral properties of the HHG process and the emitted harmonic beam are tuned by adjusting the relative delay between the two fields and the intensity of the weak secondary field.

24 Claims, 15 Drawing Sheets

(56) References Cited

OTHER PUBLICATIONS

Pfeifer et al., "Femtosecond x-ray science", Reports on Progress in Physics, vol. 69, pp. 443-505 (2006).
Luu et al., "Extreme ultraviolet high-harmonic spectroscopy of solids", Nature, vol. 521, pp. 498-502 (2015).
Schubert et al., "Sub-cycle control of terahertz high-harmonic generation by dynamical Bloch oscillations", Nature Photonics, vol. 69, pp. 119-123 (2014).
Vampa et al., "Generation of high harmonics from silicon", arXiv preprint arXiv:1605.06345 (2016).
Boyd, R. W., Nonlinear Optics, 2nd Edition, Academic press, 2003.
Pfullmann et al., "Bow-tie nano-antenna assisted generation of extreme ultraviolet radiation", New Journal of Physics, vol. 15, pp. 093027 (2013).
Pfullmann et al., "Nano-antenna-assisted harmonic generation", Applied Physics B, vol. 113, pp. 75-79 (2013).
Guler et al, "Nanoparticle plasmonics: going practical with transition metal nitrides", Materials Today, vol. 18, No. 4, pp. 227-237 (2015).
Barwick et al., "Photon-induced near-field electron microscopy", Nature, vol. 462, pp. 902-906 (2009).
Kawata et al., "Plasmonics for near-field nano-imaging and superlensing", Nature Photonics, vol. 3, pp. 388-394 (2009).
Zhang et al., "High contrast 3D imaging of surfaces near the wavelength limit using tabletop EUV ptychography", Ultramicroscopy, vol. 158, pp. 98-104 (2015).
Chapman et al., "Femtosecond Diffractive Imaging with a Soft-X-ray Free-Electron Laser", Nature Physics, vol. 2, pp. 839-843 (2006).
Förg et al., "Attosecond nanoscale near-field sampling", Nature Communications 7, (2016).
Kim et al., "Petahertz optical oscilloscope", Nature Photonics, vol. 7, pp. 958-962 (2013).
Vampa et al., "Linking high harmonics from gases and solids", Nature, vol. 522, pp. 462-464 (2015).
Ciappina et al., "High-order-harmonic generation from inhomogeneous fields, "Physical Review A 85, pp. 033828-1 to 333828-11 (2012).
Yu et al., "Flat optics with designer metasurfaces", Nature Materials, vol. 13, pp. 139-150 (2014).
Barbry. et al., "Atomistic Near-Field Nanoplasmonics: Reaching Atomic-Scale Resolution in Nanooptics", Nano Letters vol. 15, pp. 3410-3419 (2015).
http://www.mtixtl.com/sossilicononsapphire-2.aspx, Nov. 4, 2016.
Ghamsari et al., "Enhanced Raman scattering in graphene by plasmonic resonant Stokes emission", Nanophotonics, vol. 3, No. 6, pp. 363-371, Dec. 2014.
Mousavi et al., "Periodic plasmonic nanoantennas in a piecewise homogeneous background", Optics Express; vol. 20, No. 16; pp. 18044-10865 (2012).
Vampa et al. "Theoretical Analysis of High-Harmonic Generation in Solids", Physical Review Letters PRL 113; pp. 373901-1 to 073901-5 (2014).
Vampa et al., "Semiclassical analysis of high harmonic generation in bulk crystals", Physical Review B 91; pp. 364302-1 to 064302-11 (2015).
Piller, "Silicon (Amorphous) (a-Si)", E. D. Palik, Handbook of Optical Constants of Solids, Academic Press, San Diego, vol. 1, pp. 571-586 (1998).
Keldysh et al., "Ionization in the Field of a Strong Electromagnetic Wave", Soviet Physics JETP, vol. 20, No. 5, pp. 1307-1315, (1965).
Corkum et al., "Attosecond science", Nature Physics vol. 3, pp. 381-387 (2007).
Ghimire et al., "Observation of high-order harmonic generation in a bulk crystal", Nature Physics, vol. 7, pp. 138-141 (2011).
Vampa et al, "Linking high harmonics from gases and solids", Nature, vol. 522, pp. 462-472 (2015).
Schultze, et al., "Attosecond band-gap dynamics in silicon", vol. Science 346, Issue 6215, pp. 1348-1352 (2014).
Pronin et al., "Harmonic generation by a one-dimensional conductor: Exact results" Physical Review B, 50, pp. 3473-3476 (1994).
Vampa et al., "Theoretical Analysis of High-Harmonic Generation in Solids", Physical Review Letters, PRL 113, pp. 373901-1 to 073091-5 (2014).
Wu et al., "High-harmonic generation from Bloch electrons in solids", Physical Review A 91, pp. 043839-1 to 343839-11(2015).
Hohenleutner et al., "Real-time observation of interfering crystal electrons in high-harmonic generation", Nature, vol. 523, pp. 572-589 (2015).
Hawkins et al., "Effect of multiple conduction bands on high-harmonic emission from dielectrics", Physcial Review A 91, pp. 013405-1 to 013405-5 (2015).
Semiconductors on NSM website—http://www.ioffe.ru/SVA/NSM/Semicond/, Nov. 4, 2016.
Dudovich et al., "Measuring and controlling the birth of attosecond XUV pulses", Nature Physics, vol. 2, pp. 781-786 (2006).
He et al., "Inteference effects in two-color high-order harmonic generation", Physical Review A82, pp. 033410-1 to 333410-4 (2010).
Jellison, "Optical functions of GaAs, GaP, and Ge determined by two-channel polarization modulation ellipsometry", Optical Materials, vol. 1, pp. 151-160 (1992).
Dahlstrom et al., "Quantum mechanical approach to probing the birth of attosecod pulses using a two-colour field", Journal of Physics B: Atomic, Molecular and Optical Physics, vol. 44, pp. 095602-095608 (2011).
Ruzicka et al., "Second-Harmonic Generation Induced by Electric Currents in GaAs", Physical Review Letters, PRL 108, pp. 077403-1 to 077403-5 (2012).
Smirnova et al., "High harmonic interferometry of multi-electron dynamics in molecules", Nature, vol. 460, pp. 972-977 (2009).
Rickman, "The commericialization of silicon photonics" Nature Photonics, vol. 8, pp. 579-582 (2014).
Stockman, "Nanoplasmonics: The physics behind the applications" Physics Today, pp. 39-44 (2011).
Kim et al., "High-harmonic generation by resonant plasmon field enhancement", Nature, vol. 453, pp. 757-760 (2008).
Park et al.,"Plasmonic generation of ultrashort extreme-ultraviolet light pulses", Nature Photonics, vol. 5, pp. 677-681 (2011).
Parket al., "Generation of EUV radiation by plasmonic field enhancement using nano-structured bowties and funnel-waveguides", Ann. Phys., vol. 525, No. 1-2, pp. 87-96 (2013).
Kim et al., "Nanostructure-enhanced atomic line emission", Nature, vol. 485, pp. E1-E3 (2012).
Sivis et al., "Extreme-ultraviolet light generation in plasmonic nanostructures", Nature Physics, vol. 9, pp. 304-309 (2013).
Raschke, "High-harmonic generation with plasmonics: feasible or unphysical?" Ann. Phys., vol. 525, No. 3, pp. A40-A42 (2013).
Feist et al., "Nanoplasmonic near-field synthesis", Physical Review A 87, pp. 033816-1 to 033816-6 (2013).

* cited by examiner

APPARATUS AND METHOD FOR GENERATION OF HIGH HARMONICS FROM SILICON

CROSS-REFERENCE TO RELATED APPLICATIONS

This application claims benefit of priority of U.S. Provisional Patent Application No. 62/248,372, entitled "GENERATION OF HIGH HARMONICS FROM SILICON," filed Oct. 30, 2015. The entire contents and disclosures of these patent applications are incorporated herein by reference in their entirety.

BACKGROUND

Field of the Invention

The present invention relates to non-linear light-matter interaction in solids. More specifically, the present invention is directed to controlled generation of high-order harmonics in silicon media and applications of this control.

Background of the Invention

Extracting information from fast-evolving phenomena requires probe signals that are shorter in duration than the time scale of the physical phenomena under study. Tunable generation of such ultra-short signals in ultraviolet regime, particularly in technically relevant material such as silicon, despite their broad implications, have not yet been achieved. Disclosed embodiments of the present invention provide novel methods, systems and applications enabled by silicon based implementation of broadband coherent ultraviolet radiation and tunable attosecond pulse formation, accomplished via controlled high harmonic generation from silicon material (i.e., silicon generation medium.)

SUMMARY

According to first broad aspect, the present invention provides a method comprising: applying a driving electromagnetic field to a silicon medium to thereby cause the silicon medium to emit a harmonic beam and applying a control field to the driving electromagnetic field in an interaction region of the silicon medium to thereby control one or more properties of the harmonic beam. The driving electromagnetic field has a first frequency and the harmonic beam comprises a plurality of high-order harmonics of the first frequency. The control field has a second frequency that is a second harmonic of the first frequency. The one or more properties consist of spectral, temporal and spatial properties of the harmonic beam.

According to a second broad aspect, the present invention provides an apparatus comprising: a silicon generation medium, a driving field generator configured to apply a driving electromagnetic field to the silicon medium to thereby cause the silicon medium to emit a harmonic beam, and a control field generator configured to apply a control field to the driving electromagnetic field in an interaction region of the silicon generation medium to thereby control one or more properties of the harmonic beam. The driving electromagnetic field has a first frequency and the harmonic beam comprises a plurality of high-order harmonics of the first frequency. The control field has a second frequency that is a second harmonic of the first frequency wherein the one or more properties consist of spectral, temporal and spatial properties of the harmonic beam.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the instant invention.

DETAILED DESCRIPTION OF THE INVENTION

Definitions

Figure 1:
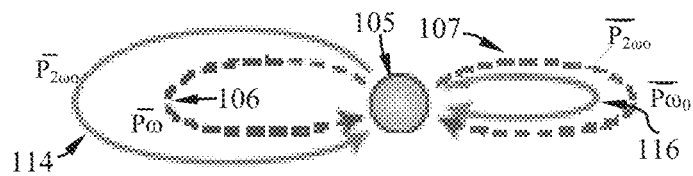
FIG. 1 is a pictorial representation of an electron's trajectories and field profiles for two successive half-cycles of a fundamental field in presence of a second-harmonic control field, according to one embodiment of the present invention.
Figure 1:
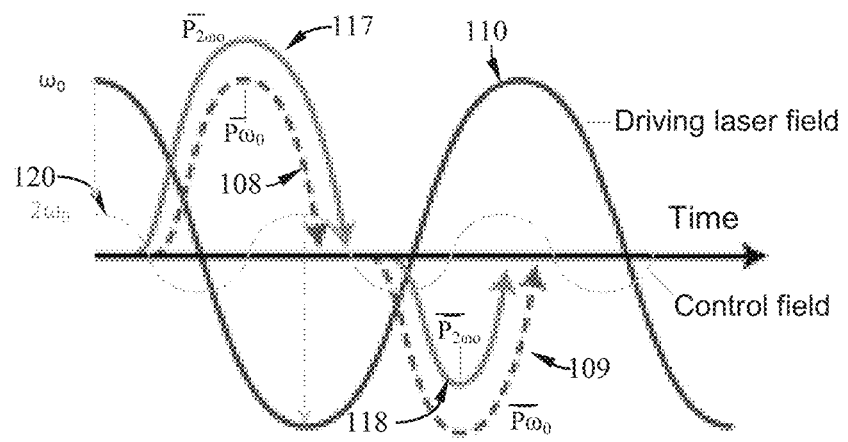

Where the definition of terms departs from the commonly used meaning of the term, applicant intends to utilize the definitions provided below, unless specifically indicated.

For purposes of the present invention, it should be noted that the singular forms, "a," "an" and "the," include reference to the plural unless the context as herein presented clearly indicates otherwise.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing figures may be flipped over, rotated by 90° in any direction, reversed, etc.

For purposes of the present invention, a value or property is "based" on a particular value, property, the satisfaction of a condition or other factor if that value is derived by performing a mathematical calculation or logical operation using that value, property or other factor.

For purposes of the present invention, the term "AC field" refers to a periodically or non-periodically varying electric field.

For the purposes of the present invention, the term "Brillouin zone" refers to a particular choice of the unit cell of the reciprocal lattice. It is defined as the Wigner-Seitz cell (also called Dirichlet or Voronoi Domain) of the reciprocal lattice. It is constructed as the set of points enclosed by the Bragg planes, the planes perpendicular to a connection line from the origin to each lattice point and passing through the midpoint. Alternatively, it is defined as the set of points closer to the origin than to any other reciprocal lattice point. The whole reciprocal space may be covered without overlap with copies of such a Brillouin Zone.

For purposes of the present invention, the term "characteristic atomic binding field strength" refers to the atomic field strength keeping outer most electrons bound to the parent atom. In order for an impinging electromagnetic field to ionize the atom it must have a field strength equal to or in excess of the characteristic atomic binding field strength.

For purposes of the present invention, the term "DC field" refers to a constant electric field.

For purposes of the present invention, the term "drive laser" may be used interchangeably with the term "driving laser".

For purposes of the present invention, the term "driving field" or "drive field" refers to the electric field associated with a driving laser and may be used interchangeably with the terms "driving laser field" or "drive laser field."

For purposes of the present invention, the term "driving laser" refers to the fundamental signal, if the fundamental signal is a laser pulse.

For the purposes of the present invention, the term "first Brillouin zone" refers to a uniquely defined primitive cell in reciprocal space. The boundaries of this cell are given by planes related to points on the reciprocal lattice. It is found by the same method as for the Wigner-Seitz cell in the Bravais lattice. The importance of the Brillouin zone stems from the Bloch wave description of waves in a periodic medium, in which it is found that the solutions can be completely characterized by their behavior in a single Brillouin zone. The first Brillouin zone is the locus of points in reciprocal space that are closer to the origin of the reciprocal lattice than they are to any other reciprocal lattice points. Another definition is as the set of points in k-space that can be reached from the origin without crossing any Bragg plane.

For purposes of the present invention, the term "fundamental field" refers to the electric field associated with a fundamental signal.

For purposes of the present invention, the term "fundamental frequency" refers to the frequency of the fundamental signal.

For purposes of the present invention, the term "fundamental signal" refers to a signal that non-linearly interacts with a medium in order to produce high-order harmonics of the fundamental signal frequency from the medium.

For purposes of the present invention, the term "high-order harmonic" refers to the high integer multiples of the fundamental signal.

For the purposes of the present invention, the term "high symmetry points" refers to a set of points in reciprocal space that are closer to the origin of the reciprocal lattice than they are to any other reciprocal lattice points.

For purposes of the present invention, the term "interaction region" refers to the region where a fundamental signal interacts with a medium in order to generate high-order harmonics of the fundamental signal from the medium.

For purposes of the present invention, the term "laser-driven electron-ion re-collision process" refers to the electron re-collision process underlying the high harmonic generation process when such a process is driven by a laser signal.

For purposes of the present invention, the term "modulated" refers to the act, effect, outcome or condition of modulation upon a signal.

For purposes of the present invention, the term "modulation" refers to any type of modification or alteration brought upon or imposed onto the spatial, temporal or spectral properties of a signal.

For purposes of the present invention, the term "nanoplasmonic features" refers to any feature that produces/controls/modifies or is subjected to one or more plasmonic events at the nano scale.

For purposes of the present invention, the term "nanoplasmonic" refers to the plasmonic effect that occurs at the nano scale.

For purposes of the present invention, the term "optical signal" refers to an electromagnetic signal with a wavelength range extending from Infra-red to X-ray regime.

For purposes of the present invention, the term "plasmonic" refers to an effect or condition that involves or is related to the collective oscillation of conduction-band electrons in a medium in response to an electromagnetic field.

Description

As in stroboscopic photography, wherein the fastest motion that can be captured is defined by the camera shutter speed or the duration of the flash, accurate measurement of ultrafast phenomena are generally bound by the duration of the probe pulse. A laser pulse, for example, may be used as an optical probe for measurement of ultra-fast processes unraveling at molecular and atomic scales. The minimum achievable duration for an optical pulse is the time period of a single optical cycle. For standard lasers in infrared spectral ranges, this period corresponds to a few femtoseconds. A few femtoseconds are therefore the limit for the shortest pulse that can be generated with standard lasers. Therefore, breaching the attosecond atomic time scale barrier necessarily requires pushing the spectral region of operation from near-infrared (NIR) or mid-infrared (MIR) regime of standard lasers into the ultraviolet regime and beyond.

Converting NIR or MIR photons (e.g. 1.6 eV) to much higher photon energies (e.g., 100 eV) requires a significant generation-energy boost. The necessary frequency up-conversion, required for generating ultraviolet range radiation from infrared range lasers, may occur when the optical response of a generating medium is driven into the nonlinear regime. This may be accomplished, for example, through exposure to a very high intensity laser pulse. Any nonlinear system that is driven by an intense monochromatic field will respond at harmonic frequencies of the driving electromagnetic field. The harmonic response may stabilize over an extended range of harmonic-orders before it eventually drops off. Such a harmonic response profile is characteristic of neutral atoms subjected to an intense electromagnetic field. When such an atomic medium is driven, for example, by an intense NIR or MIR laser pulse of central frequency $\omega_0$, it may exhibit a broadband emission profile consisting of several harmonics of the fundamental frequency $\omega_0$. The broadband emission profile may span a spectral range up to, for example, ultra-violet and soft x-ray regime. This nonlinear strong-field optical process wherein a laser pulse of standard wavelength, such as infrared laser beam, is converted into coherent radiation in a much shorter wavelength regime, such as ultraviolet or soft X-ray frequency regime, is known as high-order harmonic generation (HHG) process[1,2,3].

In the context of HHG, a laser pulse is considered strong when its electromagnetic field strength approaches the characteristic atomic binding field strength, i.e., field strength or force experienced by electrons in the coulomb field of an atom in the generation medium. The strong electric field present at a laser focus will suppress the coulomb potential that holds the electron to the nucleus. The suppression of the coulomb potential facilitates a valence electron to tunnel through the potential barrier by a process known as strong field ionization. Following the ionization process the freed electron is accelerated in a trajectory away from its parent ion by the same electric field. When the oscillating electric field changes direction, during the negative half of the oscillation cycle, the electron trajectory is reversed. The electron is now accelerated back towards the parent ion by the electric field. On its way back the electron acquires a large amount of kinetic energy due to the strong acceleration imparted by the laser electric field. Upon re-collision and recombination with the parent ion the stored ionization energy and the kinetic energy of the electron, gained by its interaction with the laser field, is released as a radiation pulse. This radiation pulse will have a frequency related to the harmonics of the driving laser field. Since many electrons take part in this process, during each half-cycle of the laser field, there will be a broad distribution of possible trajectories and kinetic energies at recombination[4]. This will correspond to multiple frequency components in the emission spectrum. The result is a broadband UV or XUV emission with a typical spectrum of high-order harmonics. If the radiation is continuous and phase locked, the corresponding temporal profile will be that of an attosecond pulse whose duration decreases as the number of combined harmonics increases. The attosecond time-scale of the pulse emerges as a result of coherent superposition of harmonic orders of the fundamental frequency ($\omega_0$). Since this coherent process occurs at every half cycle of the periodic drive laser, the UV/XUV emissions will be characterized by a series of attosecond-scale bursts separated in the time domain by half the laser period, i.e., ½T. The corresponding frequency domain representation is that of a harmonics frequency comb consisting of frequency peaks (harmonics) separated by twice the fundamental frequency, i.e., $2\omega_0$. The consecutive bursts correspond to respective electron-ion collisions emanating from opposite directions (due to being driven by opposite polarity half cycles of the oscillating laser field.) This results in the emission of spectral components with opposite phases (but the same amplitude due to the inversion-symmetric property of the generating medium.) The upshot is inherent destructive interference of the even-order harmonics (interchangeably referred to as even harmonics) and constructive interference of the odd-order harmonics (interchangeably referred to as odd harmonics.) Consequently, even-order harmonics are erased and only odd-order harmonics are observed in the standard HHG spectrum[1,2,3].

In principle a broad spectral width enables the formation of attosecond pulses. Following the identification of electron-ion re-collision as the primary interaction underlying HHG from atomic gas-based medium, experimental techniques have been developed to modulate the interaction to thereby tune and enhance the harmonic response of the atomic or gas-based medium. These techniques are typically based on shaping the intensity profile of a driving field to thereby influence and modify the spectral phase of the resulting high harmonic emissions (i.e., enhance the harmonic bandwidth generated through the laser-driven electron-ion re-collision process).

Since the first observation of high-order harmonics about two decades ago, much of the relevant effort has been directed toward the theoretical study, analysis and experimental realization of the HHG technology in gas-phase medium. The primary progress in the field has been associated with HHG implementation in gaseous medium. Consequently, relative to solid-state domain, HHG in gases is far more developed and in widespread application today. Motivated, in part, by the deficiency in understanding of the HHG process in the most technologically relevant material such as silicon, one aspect of the present invention seeks to cultivate a detailed insight into the emission mechanism underlying HHG in silicon medium by building upon the established similarity in the strong-field ionization response of solids and gases. Furthermore, disclosed embodiments seek to identify, characterize and experimentally verify the dominant interaction underlying high-order harmonic generation in silicon medium. Other embodiments of the present invention disclose an operational platform and methodology for in-situ generation, measurement and manipulation of broadband emission of coherent ultra-violet radiation and tunable attosecond pulse formation in material platform for integrated electronics, photonics and optoelectronics applications, such as, for example, silicon medium. Accordingly, it is a goal of the present invention to expand the scope and extend the commercial relevance and applicability range of the HHG technology.

Disclosed embodiments provide novel methods, systems and applications enabled by a silicon-based implementation of broadband coherent XUV radiation and tunable attosecond pulse formation, accomplished via controlled high harmonic generation from silicon material (i.e., silicon generation medium.)

While the present invention is disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof. It is understood that other embodiments may be utilized and structural changes may be made without departing from the scope of the invention.

Electron-hole pair creation by high order multiphoton transitions (often approximated as tunnelling), followed by the motion of the electrons and holes within and between their respective bands is the fundamental mechanism underlying strong-field light matter interactions and harmonic generation. In atoms, the motion of the electron can be characterized by two different dynamics. In one, known as intra-band transition, the newly freed electron undergoes oscillatory motion in the presence of the applied electric field. In the other, illustrated in FIG. 1, the freed electron undergoes a boomerang type trajectory that results in re-collision and recombination of the electron with its associated hole (parent ion) and emission of a high energy photon as a consequence of the process. Since both dynamics involve the formation of an oscillating dipole, they are both potential sources of harmonic radiation. In gaseous medium the former dominates low-order harmonics generation while the latter dominates high-order harmonics generation. In the case of high-order harmonic generation (HHG) in solids, such as silicon, contributions from both dynamics must be considered.

Intra-band transition in solids deviates from the free electron model in gases. Due to the interaction of the electron with the lattice, the electron motion does not follow the sinusoidal motion of the electric field. HHG model in solids must, therefore, include both mechanisms, namely the non-sinusoidal electron dynamics, and the electron-ion re-collision dynamics following a high-field ionization process. Ever since the prediction of 50 years ago, the electrons in atoms and solids respond similarly to strong laser fields,[1] tunneling has been the matter of intense research in atoms and atomic medium (gasses) while less attention has been paid to solids. In atoms tunneling is followed by acceleration of the ionized electrons and their recollision with the atomic core, a process that emits high-order harmonics of the driving laser field.[2] In solids, to date, recollision-based high harmonics have been generated only from ZnO,[3,4] a semiconductor with a wide direct bandgap, and with mid-infrared lasers. Following the demonstration of tunneling from silicon with an 800 nm laser,[5] and because the adiabatic character of tunneling increases at longer wavelengths, recollision-based high harmonics employing a mid-infrared laser should be generated from silicon as well. If harmonics from silicon are measured, however, it is important to establish their origin. Namely, their emission from a single band,[6] or from recombination of the electron-hole pair between two bands,[7] or furthermore from interplay between multiple bands.[8,9,10]

In accordance to one aspect of the present invention tunable generation and measurement of recollision-based high harmonics, that extend from the mid-infrared to the ultra-violet spectral region, from small in-direct band gap material such as, for example, silicon is demonstrated. Furthermore, and in accordance with another embodiment of the present invention, the high harmonic generation process in small in-direct band gap material such as, for example, silicon is fully characterized and its physical origin established. Namely to determine how such coherent radiative phenomena from a silicon medium are associated with direct and/or indirect tunneling. Other exemplary embodiments explore HHG generation sensitivity in silicon to perturbing fields as low as 20 V/μm, which are below the DC breakdown field of 30 V/μm[11] and crystallographic orientation with respect to the linear laser polarization.

HHG processes in small in-direct bandgap semiconductor medium, such as silicon[5], may be used as a diagnostic tool for studying, for example, the ultrashort temporal and spatial dynamics and probing attosecond time-scale phenomena associated with silicon electronics. In order to understand, control and ultimately exploit the potential of the HHG process in silicon based diagnostic tools, the primary physical mechanism for high-order harmonics generation in small in-direct bandgap material such as, for example, a silicon generation medium must be identified.

In accordance with one aspect of the present invention a mid-infrared (MIR) laser pulse is used to study a response of a silicon based semiconductor medium to an incident high-intensity field. Short emission bursts corresponding to odd-ordered harmonics of the fundamental frequency of the MIR laser are recorded. This observation demonstrates successful generation of high-order harmonics from a semiconductor medium. Emissions corresponding to even-order harmonics of a driving field are observed when a driving field, introduced, for example, via a first input is perturbed with a weak secondary control field introduced, for example, via a second adjustable input [12,13]. The secondary control filed may have a frequency equal to the second harmonic of the fundamental frequency (frequency of the driving field.) Further control over the high-order harmonic generation process is demonstrated by utilizing the adjustable input to variably delay the second-harmonic control field relative to the fundamental field. Modulation of the relative delay between second-harmonic control field and fundamental field results in modulation in the strength of the observed even harmonics emitted from the silicon medium. It is experimentally observed that the phase of the modulation as a function of harmonic order determines the spectral phase (emission time) of the emitted harmonic beam. This observation facilitates the characterization of physical mechanism underlying the HHG process in the indirect bandgap material such as, for example, silicon. It should be noted that the second-harmonic control field may have an internal or an external source, i.e., it may be applied through one or more internal terminals fashioned on the surface or within the bulk of the silicon medium, or applied through one or more external terminals coupled to one or more external sources. For example the second-harmonic control field may be applied through electrodes patterned on or within the silicon medium.

As stated earlier, strong-field assisted electron tunneling and the subsequent motion of the electron in the continuum, followed by a possible re-combination of the electron-hole pair is the fundamental mechanisms underlying HHG process. Due to its quantum nature, the interaction is governed by the phase of the released electron wave-packet. Therefore tracking the dynamics of the electron wave packet (from ionization to field-driven acceleration to radiative recombination with the parent ion) by way of treating HHG as a balanced electron interferometer, may help to elucidate the above-stated experimental observations.

Initially, an intense laser field removes an electron from its host atom, splitting the wave function into a coherent superposition of a bound state and a free-electron wave packet. In the language of interferometry, ionization process acts as an effective beam splitter. Next, the free-electron wave packet moves in the oscillating laser field and returns to the parent atom during the negative half of the driving field oscillation cycle. This effectively corresponds to an adjustable delay line. Finally, during the re-collision, the two portions of the wave function overlap. The characteristics of the resulting interference (time-dependent dipole moment) are encoded in the output attosecond radiation pulse emitted from a generation medium. The amplitude, energy and phase of the re-collision electron are transferred to the emitted radiation pulse through the dipole moment (energy transition). The control of the spectral properties, temporal properties and spatial properties of the HHG process, and by extension those of the emitted harmonic beam, requires manipulating electron trajectories on attosecond time-scale. Trace diagrams 102 and 104 in FIG. 1, illustrate an electron's propagation paths (trajectories) 106 and 107 when a host atom 105 experiences a symmetric electric field, as illustrated by positive and negative half-cycles 108 and 109, respectively. Half-cycles 108 and 109 represent an electric field cycle experienced by a host atom 105 upon which a driving laser field 110 is incident. Hence forth, driving laser field 110 may be interchangeably referenced as fundamental field 110. As can be observed from trace diagram 102, electron propagation paths 106 and 107 are symmetric in response to the symmetric profile of half-cycles 108 and 109. As such the left and right arms of the interferometer are balanced.

Due to the non-linear nature of the strong-field light-matter interaction, small perturbations in the driving laser field 110 may result in large changes in harmonic behavior of a generating medium (of which host atom 105 is a part). Solid trace 114 and 116 illustrate the expected alterations in the propagation paths (trajectories) of an electron when an electric field experienced by host atom 105 is altered as illustrated by the asymmetric profile of positive and negative half-cycles 117 and 118, respectively. The alteration is due to the perturbation of driving laser field 110. The perturbation, in this case, is introduced in form of a weak secondary control field 120 with a frequency corresponding, for example, to the second harmonic of the fundamental frequency $\omega_0$ (frequency of the driving laser field 110). The secondary control field 120, henceforth referred to as second-harmonic control field, unbalances the interferometer by increasing or decreasing the electron propagation path (trajectory) by a small amount, thus adding or removing a small amount of phase to each arm of the interferometer. As a result, the phase accumulated by the propagating electron (propagation path 114) is enhanced in the half cycle 117 when the fundamental field 110 and the second-harmonic control field 120 are appropriately phased (similarly phased). Similarly, phase accumulated by the propagating electron (propagation path 116) is suppressed in the adjacent half cycle 118 when the fundamental field 110 and the second-harmonic control field 120 are oppositely phased. The shape of the electric field experienced by an atom (represented by trace 108, 118 and 117, 118) is variably modulated by changing the relative delay (relative phase) between the control field 120 and the driving electromagnetic field 110. This alters the interference profile between the second-harmonic control field 120 and the fundamental field 110. The relative phase (also referred to as the optimum phase) that maximizes the strength of the emitted harmonics carries information related to the phase of the interfering electron wave-packets.

Amplitude and spectral phase of the emitted harmonic radiation carries the complete information about the harmonic generation process. By tuning the temporal profile of driving laser field 110 to a known state, phase and amplitude distribution of the generated high-order harmonics, and by extension the time-domain characteristics of the isolated ultrashort radiation pulse, may be predicted.

Figure 2:
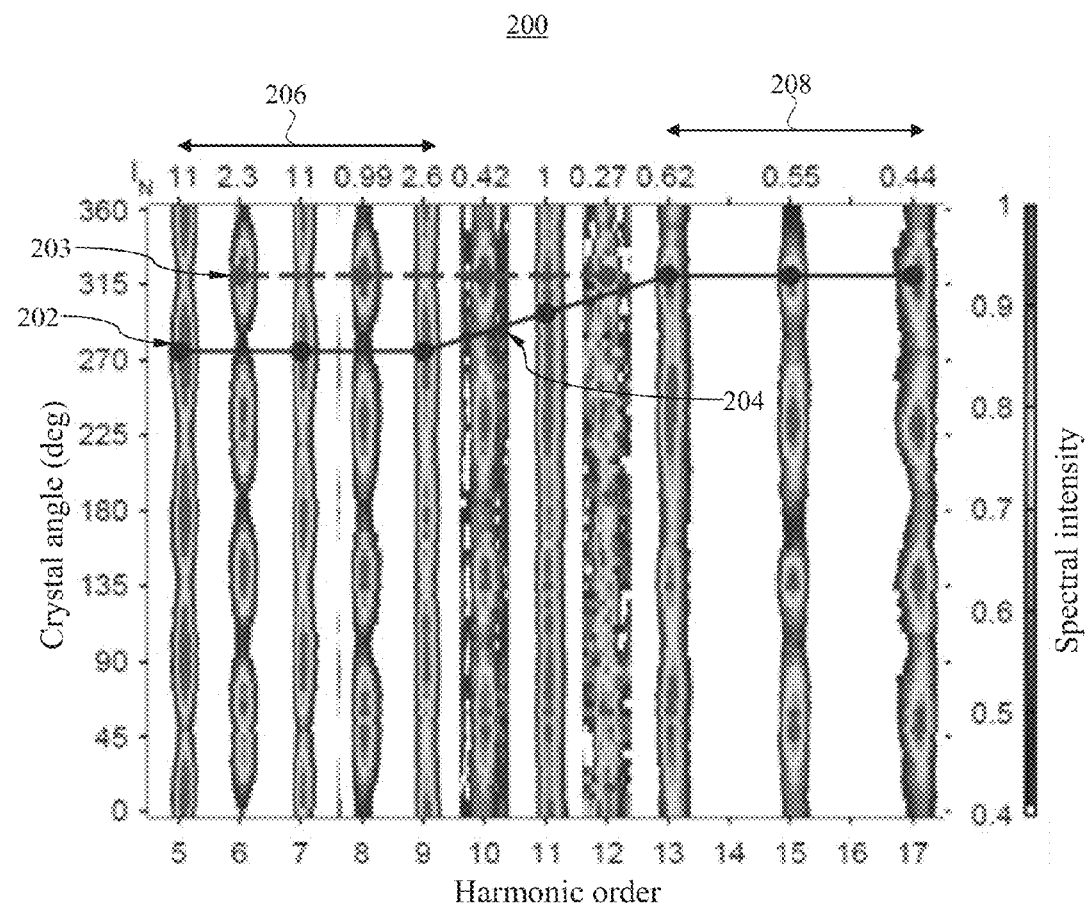
FIG. 2 illustrates the measured high harmonic spectra versus the angular orientation of the generating silicon crystal relative to the linear laser polarization demonstrated for both the fundamental field alone and in presence of second-harmonic control field, according to one embodiment of the present invention.

In accordance to one embodiment of the present invention a generation and modulation of high harmonic spectra from silicon medium is demonstrated as a function of crystallographic orientation of silicon substrate with respect to linear laser polarization. This is illustrated by the spectrogram 200 in FIG. 2. As the silicon sample is rotated about the [001] axis, generated high-harmonic spectra modulates with 4-fold symmetry, as illustrated in FIG. 2. The dotted solid trace 202 in FIG. 2 represents (at the dotted points) the crystal angle for which maximum odd-harmonic intensity occurs in presence of fundamental field alone. Adding a properly phased weak second harmonic field to the fundamental field generates even harmonics. The dotted dashed trace 203 in FIG. 2 illustrates the presence of even-order harmonics for a second-harmonic control field having an approximate intensity of $4 \times 10^{-4}$ of the fundamental (corresponding to a field strength of only 20 V/μm.) As illustrated by the dashed trace 203 the intensity of generated even harmonics is always maximized for polarization along the [110] direction. As it is observed form FIG. 2, the dotted solid trace 202, representing the crystal angle for odd harmonic emission maxima, shifts abruptly at harmonic energy 204 corresponding to the silicon bandgap. This shift is defined from polarization oriented along the [100] direction for harmonic orders below the $10^{th}$, to the [110] direction for higher order harmonics. Below the direct bandgap (at 3.4 eV, corresponding to the $10^{th}$ harmonic order), all harmonics maximize when the polarization of the fundamental beam is oriented along the [100] direction (at 270 degrees orientation as illustrated by segment 206 of the dotted solid trace 202 in FIG. 2). Above the bandgap the optimum polarization shifts to the [110] direction (at 315 degrees orientation as illustrated by segment 208 of the dotted solid trace 202 in FIG. 2).

Figure 3:
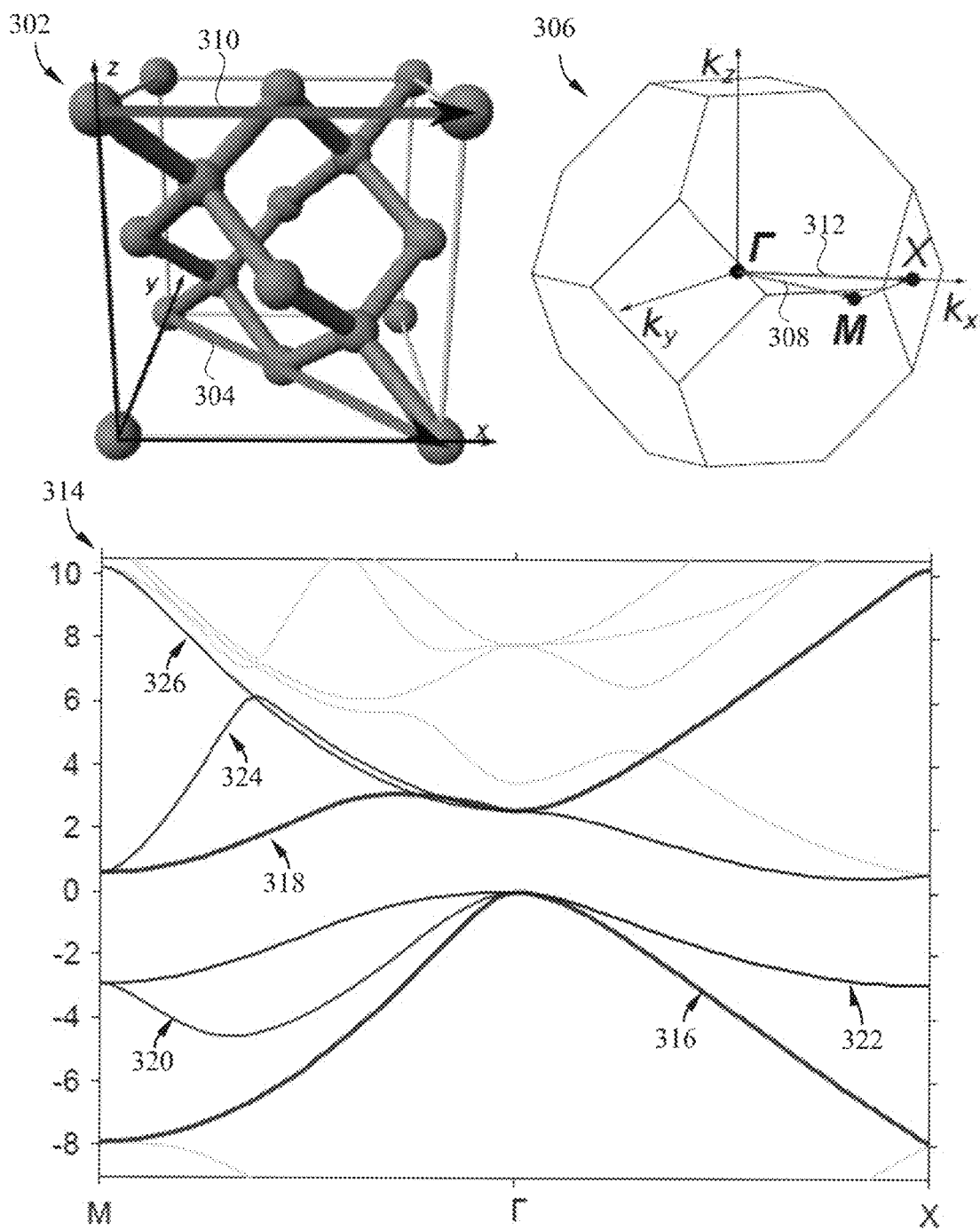
FIG. 3 is a simplified illustration demonstrating a first Brillouin Zone of the Face-centered cubic (FCC) silicon lattice, physical silicon lattice structure and a first principles calculated energy band structure of silicon.

For the case of harmonic energies above the crystalline's silicon bandgap associated with optimum polarization along the [110] direction, electron-hole pairs created by the strong laser field are accelerated along the Si—Si bonds. In FIG. 3, this propagation path is indicated on the silicon lattice structure 302 by arrow 304. In the crystal's reciprocal space 306, the corresponding electron-hole trajectory lies along the Γ-M high-symmetry direction 308 (associated with the first Brillouin zone of the FCC silicon lattice.) For the case of harmonic energies below the crystalline's silicon bandgap associated with optimum polarization along the [100] direction, electron-hole pairs created by the strong laser field move in and out of the molecular chain as indicated by arrow 310 in silicon lattice structure 302. This corresponds to propagation along the Γ-X high-symmetry direction 312 in the crystal's reciprocal space 306.

Plot diagram 314 in FIG. 3 illustrates a first-principal calculation based band structure of silicon crystal. Bands 316 and 318 are assumed to be the only energy bands involved in direct electron-hole pair tunneling at high-symmetry point Γ (for generating harmonics photon energies above that of crystalline's silicon direct bandgap.) Bands 320, 322, 324 and 326 represent energy bands that are degenerate with energy bands 316 and 318 at high-symmetry point Γ.

Once harmonics are generated, they propagate through the material before exiting the surface. Those below the direct bandgap are phase-matching limited (e.g. the coherence length is approximately 1.1 μm at around the $5^{th}$ harmonic, while the absorption length is approximately 10 μm). Those above the direct bandgap are strongly absorption limited (e.g. the absorption length reduces to approximately 10 nm at around the $12^{th}$ harmonic, while the coherence length is approximately 60 nm).[14] In principle the optical constants depend on the polarization with respect to the crystallographic axis, in practice differences less than 1% are measured for polarization along [100] and [110] directions.[14] Therefore, neither absorption nor phase-matching explains the strong rotational dependence of the harmonics. The observed behavior can only originate from the microscopic generation process.

Additional insight into the high-harmonic generation mechanism is gained by perturbing the process with a second-harmonic control field.[4, 12] When the fundamental field and its second-harmonic are properly phased, even harmonics are produced. The dotted dashed trace 203 in FIG. 2 illustrated the presence of even-order harmonics for a second-harmonic control field having an approximate intensity of $4 \times 10^{-4}$ of the fundamental (corresponding to a field strength of only 20 V/μm). All even harmonics are brightest when the polarization is along the Γ-M direction, as indicated by the dotted dashed trace 203 in FIG. 2. When the even harmonic peak intensity is normalized to the peak intensity of the lower odd order harmonics it is observed that the even harmonic signal is approximately 2-5 times higher for polarization along Γ-M than Γ-X.

Figure 4:
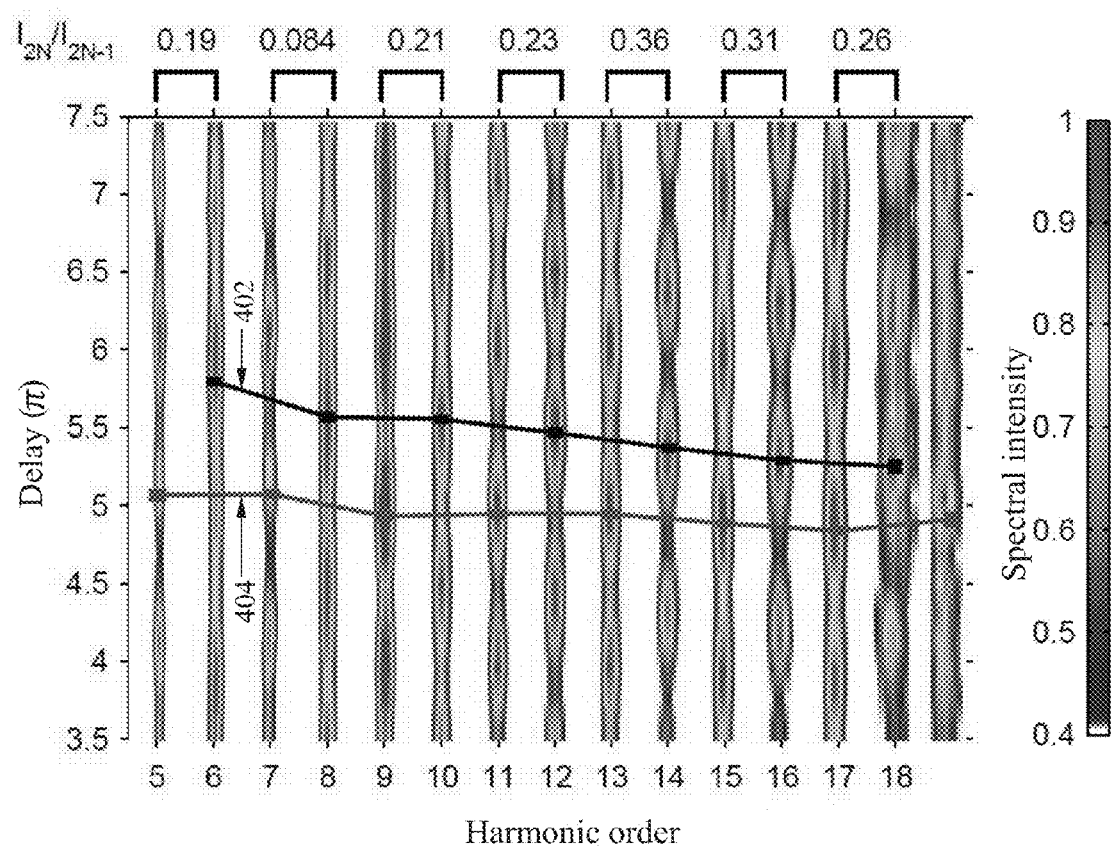
FIG. 4 is a spectrogram illustrating intensity modulation of high harmonic spectra with respect to the relative phase (delay) between the fundamental and second-harmonic control field for fundamental beam polarization along [110] direction.

The intensity of the even-order harmonic radiation emitted from a silicon medium modulates in response to variations in the relative delay between the incident fundamental field and the second-harmonic control field. FIG. 4 illustrates the resulting spectrogram 400 (showing harmonic order intensity as a function of relative delay) measured for an incident fundamental field polarization along the Γ-M direction of the Brillouin zone (along the [110] direction of physical lattice space.) As illustrated in the spectrogram 400, the phase of the oscillation for the even harmonics (trace 402) varies with harmonic order while the phase of the oscillation for the odd harmonics (trace 404) is almost constant. The relative intensity of even and odd harmonics is shown at the top of spectrogram 400.

Figure 5:
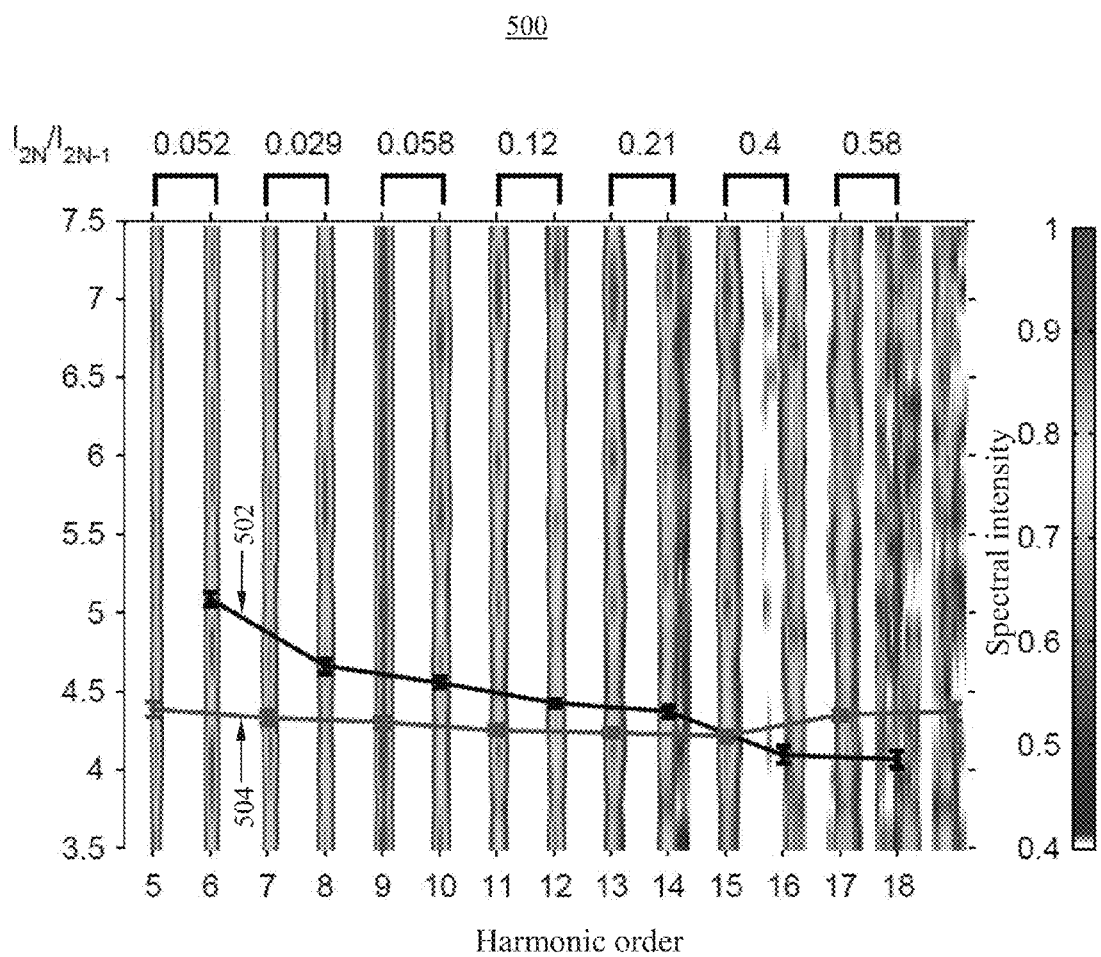
FIG. 5 is a spectrogram illustrating intensity modulation of high harmonic spectra with respect to the relative phase (delay) between the fundamental and second-harmonic control field for fundamental beam polarization along the [100] direction.

Similar outcome is observed in spectrogram 500 of FIG. 5, measured for incident fundamental field polarization along the Γ-X direction of the Brillouin zone (along the [100] direction of physical lattice space.). The phase of the oscillation for the even harmonics (trace 502) varies with harmonic order while the phase of the oscillation for the odd harmonics (trace 504) is almost constant. The relative intensity of even and odd harmonics is shown at the top of spectrogram 500.

In the experiment associated with spectrogram 400 and 500 the second harmonic intensity is increased to $9 \times 10^{-4}$ of the fundamental in order to have enough signal for polarization oriented along [100] or equivalently Γ-X direction as in spectrogram 500 in FIG. 5. As a result the $14^{th}$ and $16^{th}$ harmonic orders become visible in spectrogram 400 of FIG. 4, whereas they are not in spectrogram 200 of FIG. 2. The visibility of the modulation, defined by Equation 1, steadily increases with harmonic order from approximately 0.04 to approximately 0.8 along Γ-M and from approximately 0.1 to approximately 0.36 along Γ-X.

$$V = 2 \times (I_{max} - I_{min})/(I_{max} + I_{min}) \quad (1)$$

As illustrated in FIG. 4 and FIG. 5, the phase of the modulation of the even harmonics differs between harmonic orders (trace 402 and 502 connects the maxima of the even harmonics). A similar behavior is observed in atomic and molecular high-harmonic generation,[12, 13] and in ZnO crystals.[4] This signature confirms that recolliding electron-hole pairs and their recombination are the dominant source of harmonics in silicon for excitation with, for example, mid-infrared lasers.

Figure 6:
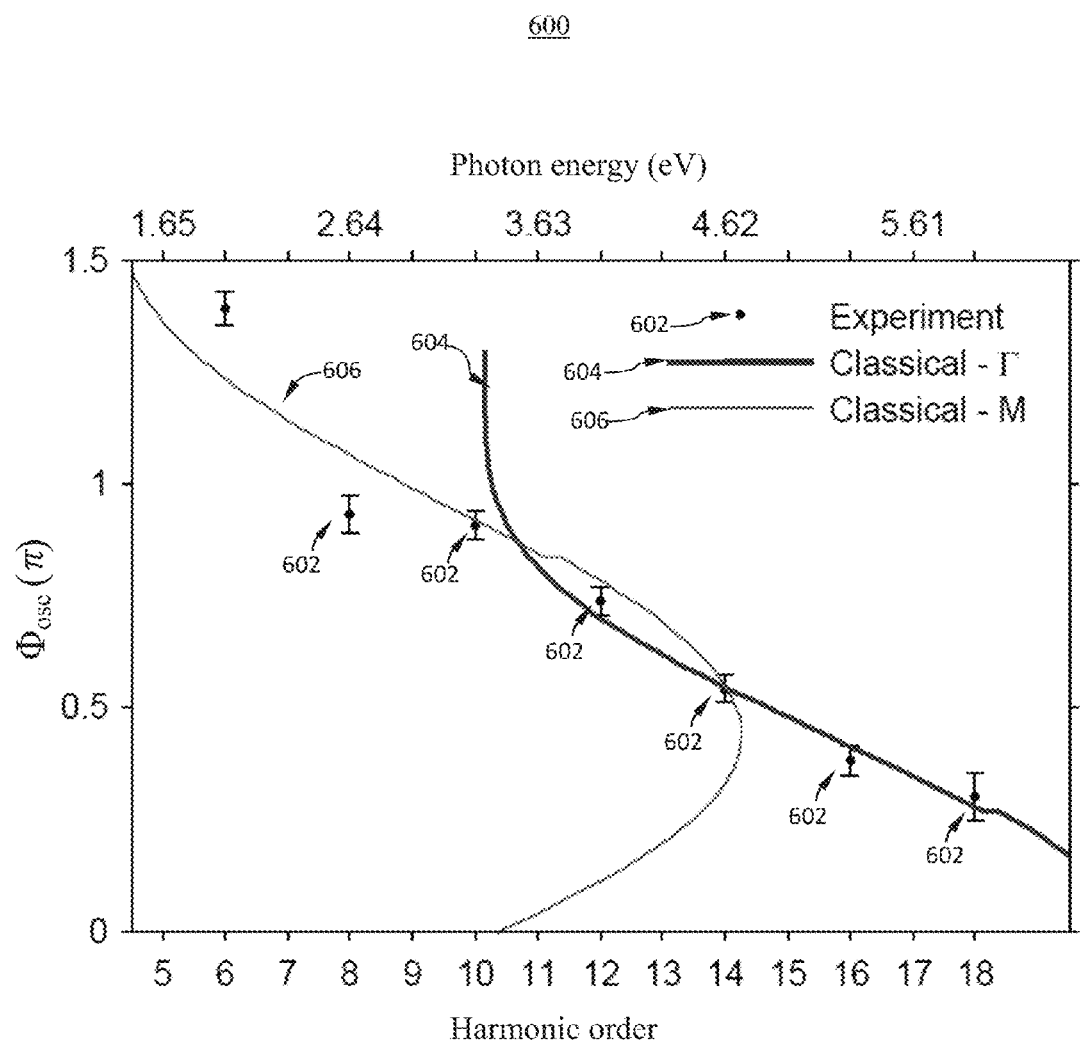
FIG. 6 is a graphical illustration of the experimentally measured optimum phase as well as theoretical representations of the optimum phase as a function of harmonic order for electron-hole pairs tunneling at high symmetry point $\Gamma$ (for polarization along the $\Gamma$-M direction) and high symmetry point M in the Brillouin zone.

Plot diagram 600 in FIG. 6 illustrates experimental result 602 corresponding to the measurement of the optimum modulation phase at different harmonic photon energies (harmonic order) in Silicon. In FIG. 6 the experimental absolute phase has been taken equal to that calculated at the 14th harmonic order.

A quantitative assessment of the experimental results 602 is carried out and represented by trace 604 and 606 in FIG. 6. Trace 604 represents the theoretical optimum phase associated with electron-hole pairs tunneling at Γ high-symmetry point for polarization along the Γ-M direction as in FIG. 4. With reference to trace 604, the minimum harmonic energy corresponds to the direct bandgap of silicon (10th harmonic order). This is because the classical calculation, used to obtain trace 604, doesn't allow recombination below the minimum bandgap.

The quantitative assessment represented by trace 604 is conducted using the analytical solution of the recollision dipole.[7] Accordingly, the phase added to the dipole by a second harmonic field may be represented by Equation 2.

$$\sigma(t, \varphi) = \int_{t'}^{t} \Delta v(\tau, t') A_2(\tau, \varphi) d\tau \quad (2)$$

In Equation 2 parameters t' and t are the birth and recollision times (specific to each harmonic order), $\Delta v = v_e - v_h = \nabla_k E_g(k)$ is the difference in the band velocities between electrons and holes in the fundamental field alone (with $E_g = E_c - E_v$, the momentum-dependent bandgap), $A_2$ is the amplitude of the second harmonic field and $\varphi$ the phase difference with the fundamental field. The crystal momentum is expressed as $k = A_1(\tau) - A_1(t')$, where $A_1$ is the vector potential of the fundamental field. The even harmonic intensity modulates as $\sin^2(\sigma)$.[15] The parameter σ may be decomposed[12] as $\sigma(t, \varphi) = \sigma_s(t)\cos(\varphi) + \sigma_c(t)\sin(\varphi)$ and the phase of the modulation calculated as $\Phi_{osc} = \arctan(\sigma_c/\sigma_s)$. When all electron-hole pair trajectories launched between the peak and the following zero of the fundamental field is calculated (each trajectory leading to emission at different harmonic photon energies), the phase of the modulation represented by trace 604 in FIG. 6 is obtained. In order to calculate the electron and hole velocities, required by Equation 2, it is assumed that tunneling only happens at high symmetry point Γ between the bands with the smallest effective mass. i.e., energy bands 316 and 318 in FIG. 3. Given the complexity of the band structure near the Γ point, it is possible that multiple bands contribute to the tunneling step.[9] When multiple molecular orbitals are ionized in gas phase experiments, attosecond electron and hole wave packets are launched[16]. Silicon can therefore be a suitable platform for studying attosecond wave packet dynamics in condescend phase.

The model of high harmonic generation presented above for computation of trace 604 in FIG. 6 assumes tunneling at the direct band gap of Silicon. In an alternative scenario, electrons pick-up momentum from phonons during tunneling and start their motion from the minimum energy state away from Γ in the conduction band. Then, electrons and holes accelerate in reciprocal space by the same amount, but remain separated by the initial momentum offset. In real space electrons and holes, initially at rest, begin to accelerate away from each other. Following their re-encounter later in the laser cycle, emission of a high harmonic photon requires recombination with exchange of the same phonons absorbed during tunneling. This scenario, represented by trace 606 and the one in which tunneling happens at Γ (trace 604) can be easily discriminated because electrons travel different portions of the Brillouin zone at different times. Therefore, $\Phi_{osc}$ is different in each case. The trace 606 in FIG. 6 shows $\Phi_{osc}$ for electrons that tunnel at M in the conduction band. Because the minimum gap is now close to the indirect band gap of silicon (1.1 eV), the classical calculation extends below the 5th harmonic. As illustrated in FIG. 6, the cut off limit of trace 606, in contrast to experimental result 602, extends only up to the 14th order. Therefore, the analysis confirms that tunneling only sees direct band gaps.[5]

The experiment shows that strong field tunneling in silicon is followed by emission of high harmonics as a result of the acceleration of electrons and holes and their subsequent recollision and recombination. It is further observed that harmonics from silicon are sensitive to very weak electric fields (as low as 20 V/μm, as shown in FIG. 2), below the DC breakdown threshold (30 V/μm) and comparable to those found in electronic circuits. It is possible to break the symmetry, thereby creating even harmonics, with DC fields. In accordance to one embodiment of the present invention the unique use of silicon for electronic components and integrated photonics[17] is exploited to record live images of working circuits, an alternative to conventional probing by second harmonic generation.[18] One embodiment involve generation of odd harmonics by the circuit at rest. During active phase a propagating electric field would break the symmetry and generate even harmonics, which would diffract according to the instantaneous distribution of the fields within the circuit.

In accordance to another embodiment of the present invention propagation of optical pulses in silicon photonics circuits may be probed. Such a system would benefits from high spatial resolution, dictated by the wavelength of the diffracted harmonics, and sub-laser-cycle temporal resolution.

In exemplary embodiment of the present invention, control of the HHG process in silicon may be established through interference of the driving field (fundamental field) and the second-harmonic control field in space rather than time. By suitable modification of the second-harmonic control field phase front, the harmonic beam in the far field may be manipulate at will, effectively enabling functionalities associated with lenses, beam splitters, diffraction gratings and spatial light modulators. In situ optical elements can be remarkably useful for future studies of solid state dynamics or ex situ experiments with the harmonic beam. Due to the weak control field (second harmonic field) required, it is plausible that DC or pulsed electric fields applied, for instance, by electrodes on the crystal, can perform the same task.

Taken together, the forgoing provides strong evidence for controlled high-order harmonic generation in silicon. The relative phase of the modulation between even and odd orders reveal detailed information on the time-dependent electron tunneling rate.

Demonstrating the dominant role of electron re-collision in high-order harmonic generation in silicon renders them an important medium for attosecond technology. For example, in gases, in situ probing allows for measurement of the field of a light pulse. It is the brief life of the re-collision electron in the continuum that provides the ultrafast gate. In accordance to one aspect of the present invention a theoretical and empirical frame work for implementing similar in situ measurement in silicon is disclosed, thereby making the light-wave technology more easily transferrable to the larger scientific community.

In summary, non-linear light-matter interaction is essential in probing materials and their dynamics. In accordance to one embodiment of the present invention a methodology and a system for controlled generation of high harmonics from silicon medium is disclosed. This enables the adaptation and application of well-developed non-perturbative methods from atomic physics to silicon. For example, a re-collision electron inevitably carries information about its origin and the band structure of the material through which it travelled. This information is encoded in the emitted harmonic spectrum. This will enables, for example, the reconstruction of a material's 3D momentum-dependent band structure from measurements of $\phi_{max}(2N)$ as a function of crystal orientation.

The ease of delivery and application of the attosecond UV pulse that is generated and controlled directly in a semiconductor substrate can significantly simplify and enhance analysis, diagnostic and metrology for a large array of silicon based integrated systems. Furthermore, realization of controlled HHG in semiconductor medium enables co-integration of these complex functionalities in the same substrate as optical and electronic processing and readout modules, thus enhancing the capabilities of the current silicon based applications while creating avenues for entirely new applications and novel technological solutions.

One embodiment of the present invention discloses a method for high resolution dynamic imaging of integrated circuits. Integrated electronic circuits are grown on silicon substrates. High harmonics generated and measured in these materials can be used to spatially image the circuit. When the circuit is off, the measured pattern reflects the shape and location of the silicon based devices in the circuit. The circuit geometry can be reconstructed from the pattern by employing available algorithms When the circuit is on, the electric fields modify the pattern. Subsequently comparison of this pattern to the "off pattern" allows the algorithm to reconstruct the distribution and magnitude of the electric fields in the circuit. The spatial resolution of the method is limited by the wavelength of the harmonics, approximately 100 nm Those skilled in the art will realize that imaging can be made active as follows: The harmonic generation process (which is much faster than any electrical switching speed) can be delayed frame by frame to make a movie of the field as a function of time. Hence, this method allows the direct 2D imaging of the instantaneous magnitude and temporal/spatial propagation profile of electric fields in an active circuit. Presently, there is no method that can measure the chip internal fields. It is potentially relevant for gaining greater insight into operation of silicon based integrated circuits and for developing more precise electronic simulation tools and models. Additionally, direct observation of charge transfer and electronic dynamics in photovoltaic cells and transistors through monolithic integration of attosecond spectroscope in silicon substrate can facilitate development of new photovoltaic cells that are more efficient, and transistors that switch faster.

One disclosed embodiment of the present invention provides a method for probing nano-plasmonic response in devices on silicon substrates: In a nano-plasmonic device, electric fields propagate along the interface between a semiconductor such as, for example, silicon and a metal, mostly permeating the semiconductor. Harmonics generated from this substrate and subsequently modulated by the plasmonic electric field can be used to probe the plasmonic waves and measure the electric field of a propagating plasmon. These devices can be useful in engineering plasmonic devices or for tracking parasitic effects/losses in circuits. No such devices currently exist.

Plasmonic antennas can enhance the intensity of a nano-Joule laser pulse by localizing the electric field in their proximity[19]. It has been proposed that the field can become strong enough to convert the fundamental laser frequency into high order harmonics through an extremely nonlinear interaction with gas atoms that occupy the nanoscopic volume surrounding the antennas[20-22]. However, the small number of gas atoms that can occupy this volume limit the generation of high harmonics[23-25]. Here we use monopole nano-antennas to demonstrate plasmon-assisted high harmonic generation directly from the crystalline silicon substrate that hosts an array of antennas. The high density of the substrate compared to the gas allows macroscopic buildup of harmonic emission. Despite the sparse coverage of antennas on the surface, harmonic emission is 10 times brighter than without antennas. Imaging the high harmonic radiation will allow nanometer and attosecond measurement of the plasmonic field[26] thereby enabling more sensitive plasmon sensors[27] while opening a new path to extreme ultra-violet frequency combs[28].

Traditional high harmonic generation occurs in rare-gas atoms[29, 30]. Therefore, early experiments with plasmonic antennas[20] or funnels[21] seemed to require the enhanced field that permeates the air near the structures. But considerable enhancement is also achieved below and around the antennas, in the substrate that hosts them (as demonstrated and discussed in FIG. 11 below). This region is inaccessible to gas atoms.

In recent years, high harmonics have also been generated from the bulk of crystals[31-33]—in some cases with peak intensities as low as $10^{11}$-$10^{12}$ W/cm$^2$ [34]. These intensities are two to three orders-of-magnitude lower than those required in the gas phase. Not only is the threshold intensity to drive this nonlinear optical process lower than in gases, but the density of solids is ~1000 times greater. Hence, generating plasmon-assisted high harmonics from a crystalline substrate should overcome the limit of previous experiments (i.e. the need to increase the number of emitters) and improve the longevity of the nano-structures to high-power irradiation (the longevity depends on their structural quality).

Figure 8:
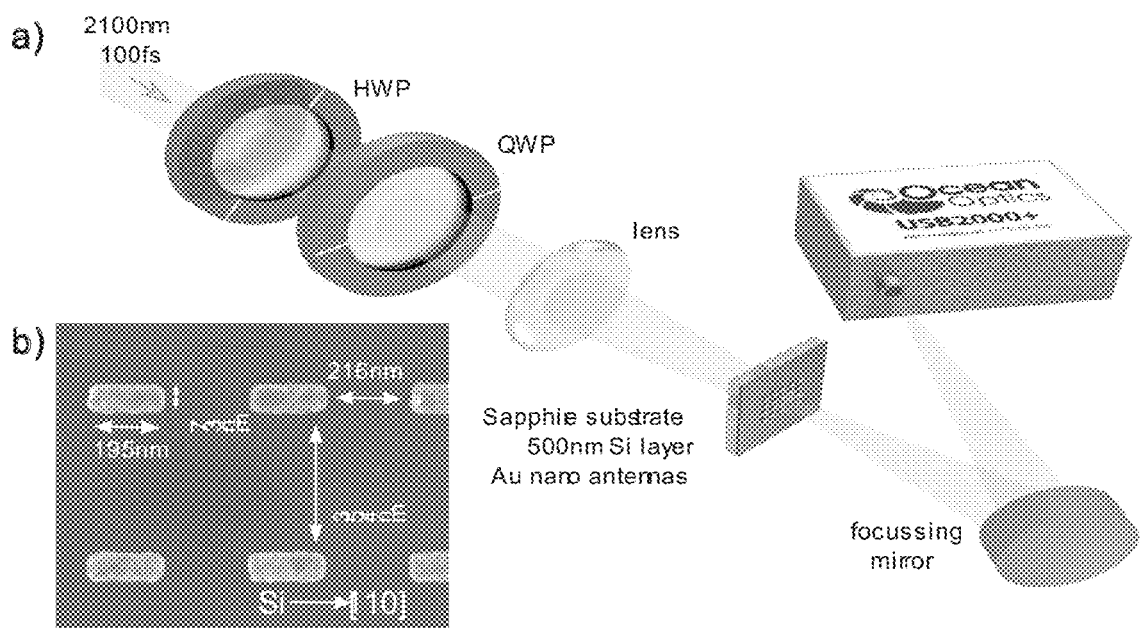
FIG. 8 is a schematic illustration of an experimental setup and high resolution SEM image of a Au nano-antenna array, according to one embodiment of the present invention.

In disclosed embodiments, several arrays of Au monopolar nano-antennas are fabricated on a thin film of single crystal Si (500 nm thick) grown on an $Al_2O_3$ single crystal substrate (0.5 mm thick). FIG. 8 is a schematic illustration of an experimental setup and high resolution SEM image of a Au nano-antenna array, according to one embodiment of the present invention. FIG. 8b shows a high resolution SEM image of a Au nano-antenna array (design and fabrication details are further detailed below in the description of the EXEMPLARY DESIGN & EXPERIMENTAL SETUP). The axis of the antennas is aligned parallel to the [110] orientation of the Si crystal, which is known to yield the brightest high harmonics from the bulk Si[34]. In a disclosed embodiments, the length, width and height of the monopoles set the resonant wavelength at 2.1 µm, the fundamental laser wavelength.

The antennas resonate with infrared laser pulses at a central wavelength of 2.1 µm delivered with a repetition rate of 10 kHz (see FIG. 8a for a sketch of an embodiment of an experimental setup (further detailed below in the description of the EXEMPLARY DESIGN & EXPERIMENTAL SETUP). In an exemplary disclosed embodiment, laser pulses with a duration of 100 fs and with a center wavelength of 2.1 µm are focused with a $CaF_2$ lens on an array of Au monopolar nano-antennas. The antennas are fabricated on a 500 nm thick single crystal Si film grown over a 500 µm sapphire substrate (M-plane cut). A combination of a half-wave plate (HWP) and a quarter-wave plate (QWP) compensates for the birefringence of the sapphire substrate to achieve horizontal linear polarization inside the Si film.

Figure 9:
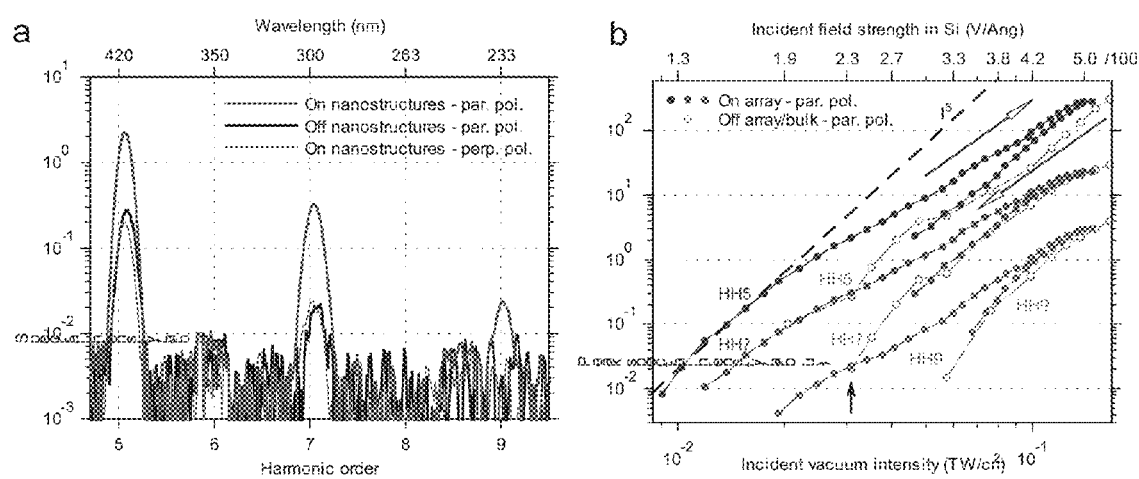
FIG. 9 illustrates a non-perturbative high harmonic spectrum, according to one embodiment of the present invention.

FIG. 9a illustrates a high harmonic spectrum extending up to the 9$^{th}$ harmonic (233 nm), when one array is illuminated with a polarization parallel (red line) and perpendicular (green line) to the major axis of the antennas. The black line is the emission from bulk Si, when the sample is illuminated on the unpatterned material beside the array. The detection limit of our apparatus extends to 200 nm, which is not enough to measure the 11$^{th}$ harmonic (at 190 nm). The vacuum intensity of the infrared driver is $3\times10^{10}$ W/cm$^2$. For polarization parallel to the antennas (red line), the emission is 5 to 10 times stronger than for polarization orthogonal to the antennas (green line), a configuration that does not lead to field enhancement (see FIG. 11). In the latter case, the polarization aligns parallel to a direction equivalent to [110]; therefore, harmonic emission from bulk silicon is unchanged. Despite the small area covered by the antennas (8%), and the small volume over which the field is enhanced, emission from the array is also stronger than the emission from the bulk, i.e. off the array (black line). Disclosed embodiments estimate that the high harmonic emission is confined to regions of ~15×15 nm$^2$ on either side of each antenna, and that the high harmonic emission density in these regions is increased by 2500-10000 times with respect to the bulk (see description below of the EXEMPLARY DESIGN & EXPERIMENTAL SETUP).

FIG. 9b illustrates the peak harmonic signal plotted as a function of the intensity of the infrared laser for one array (coloured traces) and for the bulk (gray traces), both for polarization parallel to the axis of the antennas. The On/Off contrast decreases with increasing laser intensity (blue arrow pointing up-right), and remains close to 1 for decreasing laser intensity (blue arrow pointing down-left). The scaling of bulk harmonics is reversible (not shown). All harmonics scale non-perturbatively. The dashed black line, which scales with $I^5$, is a guide to the eye. All harmonics from the bulk scale as $I^4$, where I is the incident laser intensity, whereas perturbative nonlinear optics predicts. In, where n is the harmonic order[35]. A slightly slower scaling, also non-perturbative, has been measured from bulk ZnO[33]. All harmonic orders emitted from the array (coloured lines) show the same intensity dependence, scaling with $I^3$. This suggests that they are also generated non-perturbatively.

The contrast between 'on' and 'off-the-array' steadily decreases with increasing laser intensity, approaching one at the highest intensity, then remains close to one for decreasing laser intensity. This irreversible behaviour is interpreted to be progressive damage, but it is unclear if it occurs to the Si or to the antennas (the antennas don't seem to be obviously altered, see FIG. 15). Harmonics from un-patterned Si behave reversibly. In higher bandgap materials, the intensity required for high harmonic generation increases, and extensive damage to the antennas is expected[36, 37]. However, generating harmonics from the substrate, rather than from gas atoms placed near the antennas, offers opportunities to overcome the damage limit by encapsulating the antennas in a transparent dielectric medium, such as $SiO_2$ or $MgF_2$. Alternatively, the antennas can be buried in the Si film or fabricated with materials more resilient than Au, such as TiN[38].

The diffraction of the high harmonic beam carries information about the spatial distribution of nanoscopic emission regions. The simulations predict an inhomogeneous field enhancement, which is strong at both the ends of the antennas and all along the edges (see FIG. 11). Although these tiny features cannot be imaged with the infrared beam (unless electrons[39] or near-field probes[40] are used), they should be distinguishable with a short-wavelength high harmonic beam, whose diffraction limit of $\lambda_{HH}/2$ approaches 100 nm ($\lambda_{HH}$ is the wavelength of a high harmonic order).

Figure 10:
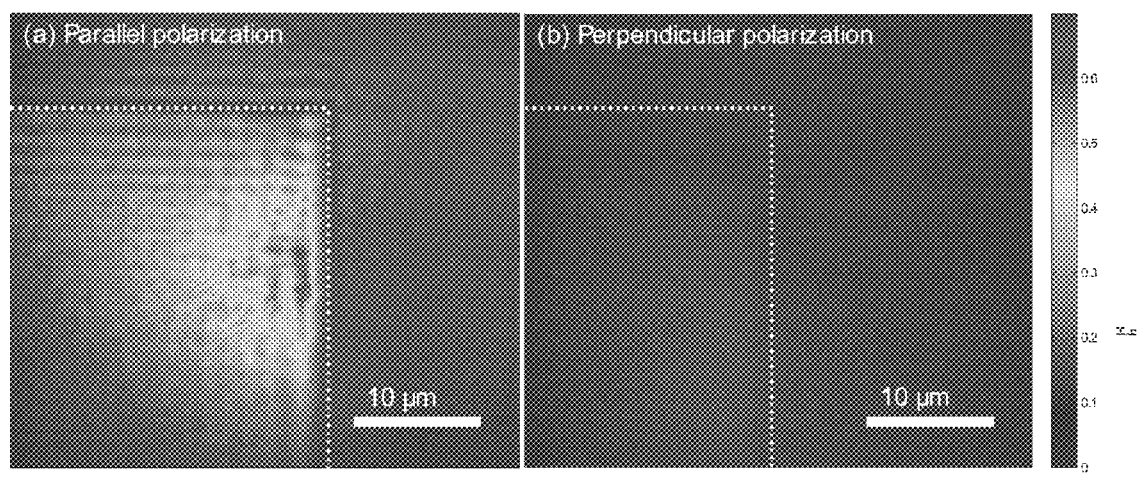
FIG. 10 illustrates imaging for high harmonic emission, according to one embodiment of the present invention.

FIG. 10 illustrates imaging for high harmonic emission—specifically, an image with the $5^{th}$ harmonic of a corner of an illuminated array. The harmonic is emitted only for the portion of the beam that overlaps with the array and for polarization parallel to the antennas' major axis (panel a)—a proof of field enhancement. The emission disappears for polarization perpendicular to the antenna's major axis (panel b). At this intensity, no harmonic emission is observed from the bulk. The contour of the array is marked by the white dotted line. FIG. 10 shows a corner of the array imaged with a magnification of 160 taken using a lens with NA=0.75 and the $5^{th}$ harmonic ($\lambda$=420 nm), for polarization of the driving field parallel (a) and perpendicular (b) to the axis of the antennas. The emission is clearly brighter over the array for parallel polarization—another indication of enhancement. The blurring of the sharp edge of the array can be used to estimate a resolution of ~1.6 µm (4.6 times larger than the expected diffraction limit, defined by the Rayleigh criterion, r=0.61$\lambda$/NA). This resolution is not sufficient to resolve individual nano-antennas. A larger numerical aperture lens should allow individual regions of field enhancement to be imaged. Lens-less imaging can also be used to exceed the diffraction limit[41-42].

Results of the disclosed embodiment have a number of important implications. First, because high harmonic emission lasts only a fraction of the optical cycle, imaging the high harmonics can map the sub-cycle dynamics of the collective electronic motion, which influence the temporal[26] and spatial properties[43] of the local plasmonic field. For example, if the antennas are resonant with a "probing field" which excites plasma oscillations, then the resulting local field will perturb the high harmonic generation process driven by a non-resonant driver. The perturbation will alter the spatial[44] or spectral[45, 46] properties of the harmonic beam. By measuring the beam, we will be able to track the spatial evolution of the local field with attosecond temporal resolution.

Second, the interference between near-field and bulk harmonics will contain a wealth of information about the fields in the antennas. For example, as the laser wavelength is scanned across the plasmonic resonance, the amplitude and phase of the near field will be modified relative to the bulk—which is largely unaffected by the frequency sweep. Each harmonic created in the array will inherit the phase shift of the plasmonic field, but multiplied by the harmonic order. Thus, this homodyne detection scheme offers a highly sensitive method for studying plasmon responses that differs from previously proposed methods[43], where an electron microscope images electrons that are simultaneously photoionized by attosecond pulses and accelerated in the local field of an infrared pulse. Coherent detection of high harmonics will enable a new generation of plasmon sensors of unprecedented sensitivity, in which small phase shifts of the resonance herald tiny variations in the environment surrounding the antennas.

Third, an inhomogeneous field will accelerate electron-hole pairs differently throughout the volume and even between successive laser half-cycles since the electrons and holes follow oppositely directed paths. If the variation in the field is sufficient across the path length of the electron and the hole, the inversion symmetry is broken, allowing even harmonics[47] to be produced. In fact, high harmonics can be thought of as a quantum sensor for small fields or for field inhomogeneity.

Although the even harmonic signal is expected to be ~42% of the nearest odd harmonic for electrons and holes that experience a wide excursion (the so-called "long trajectories"), the opposite field gradients at the two ends of each antenna average the even harmonic signal in the far-field to zero. The prediction and the macroscopic averaging are detailed in the description below of the EXEMPLARY DESIGN & EXPERIMENTAL SETUP.

This spatial average would be removed by imaging single nano-antennas with a sufficiently high NA lens. Alternatively, asymmetric antennas could be designed to remove the spatial average. In addition, the effect of the anisotropic field will be enhanced for longer wavelength driver. At 3.7 µm disclosed embodiments predict the even harmonic signal from the dominant short-trajectory electron-hole pairs will reach ~3% of the nearest odd harmonic.

Thus, in accordance with disclosed embodiments, non-perturbative harmonic generation has been observed from crystalline bulk Si assisted by plasmonic field-enhancement from an array of monopole nano-antennas. Using solids overcomes the difficulty of generating macroscopic emission with low density gas—a scheme that was tried in previous experiments[20-22]. Harmonic emission is sensitive to the orientation of the incident linear laser polarization with respect to the major axis of the antennas. This effect can be exploited to engineer the polarization of the harmonic beam in the near-field. For example, circularly polarized harmonics could be obtained by illuminating two overlapping arrays of antennas, with their major axis perpendicular to one another, while complicated geometries, such as found in metasurfaces[48], will allow even more precise control of many properties of high harmonic beams, such as amplitude and orbital angular momentum.

But light can be confined to volumes smaller than few cubic nanometers[49]. In this regime, the atomic arrangement of the atoms of the antenna becomes relevant. Such tight confinement provides an opportunity to control strong-field excitation at the level of a single unit cell. This will be a valuable tool to address several conceptual issues in high harmonic generation from solids, such as the role played by the relative diffusion of the electron and the hole, the plausibility of collisions between neighbouring electrons and holes, and the effect of boundaries and impurities on propagating electron-hole pairs. Combining solid state technology with strong field physics, high harmonic generation can be engineered at will.

Exemplary Design & Experimental Setup
Fabrication of the Antennas

Several square monopole arrays are fabricated by electron beam lithography, metal evaporation and lift-off on the (001) surface of a 500 nm thick single crystal Si film[50]. The Silicon is grown on an R-plane 500 nm thick Sapphire substrate. The Si/Sapphire substrate is first annealed at a temperature of 200° C. in ambient conditions for two hours Immediately after cool down, two layers of polymethyl methacrylate (PMMA), each with a thickness of 40 nm, are spun on the substrate to produce a re-entrant e-beam resist bi-layer. PMMA 495 A2 and 950 A2 are used for the first and second layer, respectively. Both layers are baked at 180° C. for one hour and cooled to room temperature before any further processing. The nano-antennas are patterned by electron-beam lithography at 30 keV followed by a one-hour bake at 95° C. The samples are developed in MIBK/IPA 1:3 at 20° C. A 2 Å-thick chromium adhesion layer is deposited directly on the substrate followed by evaporation of 200 Å of gold, both using electron-beam evaporation. The metal lift-off takes place in an acetone bath at 40° C. which is sonicated at 30 kHz for approximately one minute. FIG. 8 shows SEM images of a nano-antenna array.

Design of the Antennas

The nano-antennas are arranged in 100 µm×100 µm arrays with a horizontal and vertical pitch size of 411 nm and 427 nm respectively (totalling ~57.000 antennas). Each individual nano-antenna is approximately 205 nm long, 80 nm wide and 20 nm thick. Actual dimensions are within 5% of the design target. Due to their large separation, cross-coupling is minimized An array of nano-antennas supports a surface plasmon polariton resonance near 2.1 µm and produces a strong dipolar near-field. More detail regarding the operation, design rules, and scaling laws of similar nano-antenna arrays is discussed elsewhere[51, 52].

Figure 11:
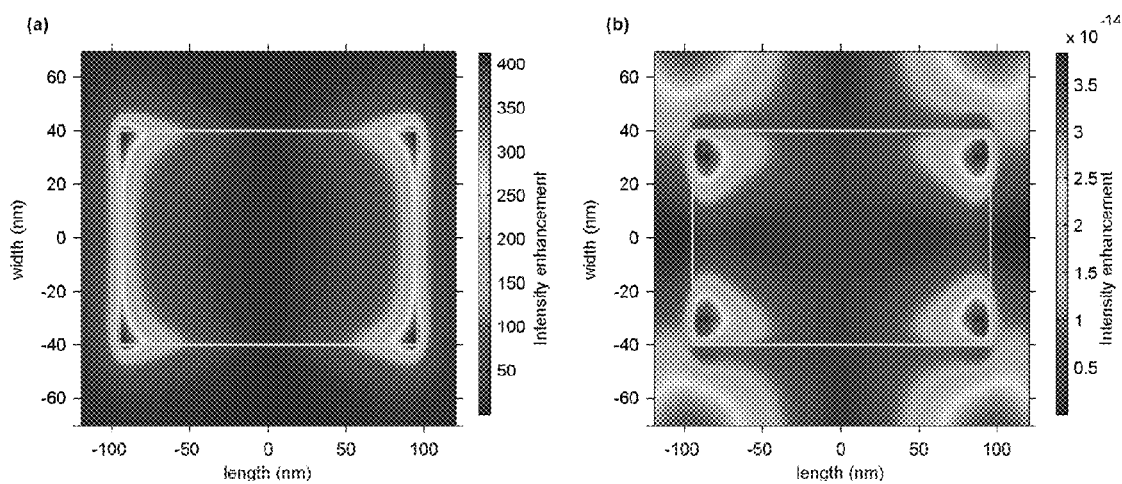
FIG. 11 illustrates imaging for spatial distribution and field enhancement with respect to an antenna, according to one embodiment of the present invention.
Figure 12:
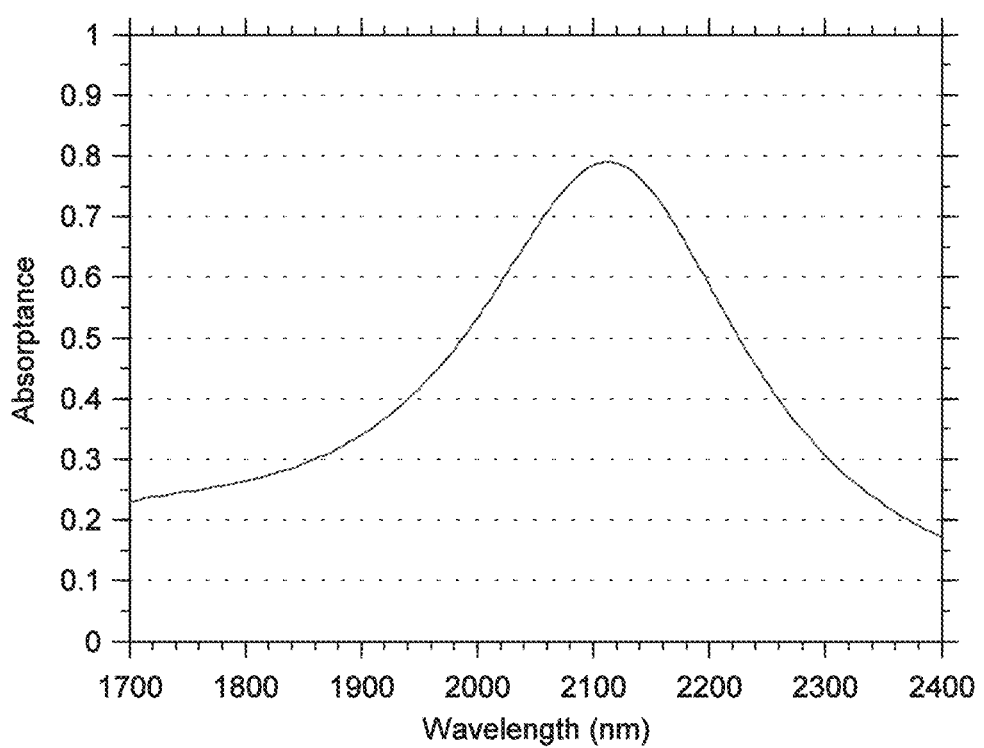
FIG. 12 illustrates calculated nano-antenna absorptance as a function of wavelength, according to one embodiment of the present invention.
Figure 13:
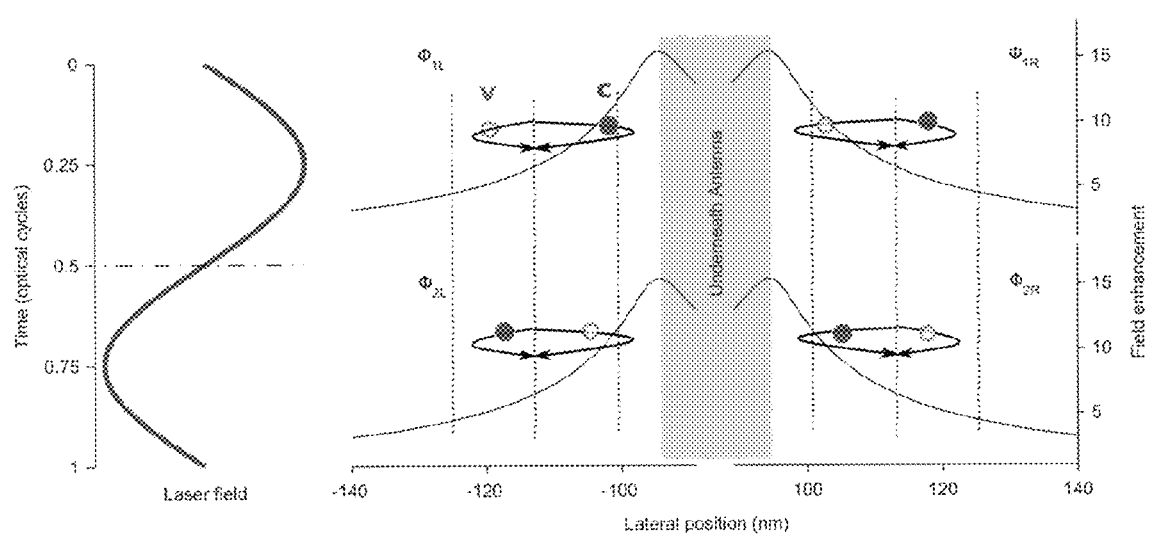
FIG. 13 illustrates a pictorial representation of propagating electrons in the conduction (c, blue circles) and holes in the valence (v, gold annuli) bands during two successive laser half-cycles, according to one embodiment of the present invention. The laser cycle is plotted in red, left side. On the left side of the antenna, electrons (holes) accumulate more phase than the holes (electrons) during the first (second) half-cycle, owing to the gradient in the field enhancement (black solid line, vertical axis to the right of figure). The situation is reversed on the right side of the antenna. The summation over both sides cancels the even harmonic signal.

FIG. 12 illustrates calculated nano-antenna absorptance as a function of wavelength, according to one embodiment of the present invention. Disclosed embodiments provide calculated nano-antenna absorptance versus excitation wavelength, for Au nano-antennas 205 nm long, 80 nm wide and 20 nm thick, deposited on a 500 nm thick layer of Si and exposed to air. FIG. 12 shows the absorptance as a function of wavelength for the designed nano-antennas, calculated by solving Maxwell's equations numerically using the finite-difference time-domain (FDTD) method and obtaining the optical performance of the system. The transmittance T and reflectance R are computed as a function of frequency at reference planes located in the far-field of the nano-antennas. The total absorptance A is defined as A=1−T−R. The figure shows that the excitation of a surface plasmon polariton mode of the nano-antennas converts far-field radiation into intense localized near-fields which enhance various optical processes including harmonic generation and surface-enhanced Raman scattering. The spatial distribution of the enhancement along a cut 5 nm below the Si surface is plotted in FIG. 11, for polarization parallel (panel a) and perpendicular (panel b) to the major axis of the antenna (outlined in yellow). Enhancement is achieved for polarization parallel to the major axis of the antennas.

Generation and Detection of High Harmonics

An optical parametric amplifier (Light Conversion OPA TOPAS-Prime) is pumped with a titanium sapphire femtosecond regenerative amplifier (Coherent Legend Elite Cryo) and delivers infrared laser pulses of 100 fs duration with a central wavelength of 2.1 µm at 10 kHz repetition rate. The beam is spatially filtered with a diamond pin-hole of 150 µm diameter and refocused into the silicon sample with a magnification of ⅔. The beam waist on the sample is comparable to the size of a nano-antenna array (100 µm). The repetition rate of the laser is 10 kHz. The average power of the laser system is significantly attenuated from P=150 mW to the required values of <1 mW (<100 nJ per pulse) by a combination of a spatial filter and a small aperture placed before the filter. Control over the power is achieved by slightly varying the aperture size. The waist on the sample is unaffected since it is a fixed fraction of the pin-hole size.

Harmonics with photon energies above the direct band gap of Si (at 3.4 eV) are strongly absorbed. Because the region of field enhancement extends only few nanometers below the Si surface, to detect these harmonics, the Si film must face the detector. The projection of the sapphire c-axis on the surface aligns to the (100) direction of the Si crystal, and therefore shows birefringence for the desired output polarization parallel to the (110) direction. Disclosed embodiments utilize a combination of a µ/2 and λ/4 wave plates to ensure that the polarization exiting the sapphire substrate and entering the Si film is linear and aligned along the (110) direction.

The harmonics are detected by focusing them through the slit of a VIS-UV spectrometer from Ocean Optics (model USB2000+).

Estimate of Dipole Phase Asymmetry

A discussion of how even harmonics may be generated and how they are suppressed by spatial averaging is explained below. It has been shown that high harmonics from silicon are interband harmonics[34]. Therefore, the high harmonic phase is the semi-classical action accumulated by electron-hole pairs between their time of creation (by under-resonant excitation between the valence and conduction bands) and their time of re-collision. Due to the gradient of the field enhancement near the edge of the nano-antenna, the particles propagating towards the antenna experience a stronger field than those travelling away from it (see FIG. 12). If electrons are those propagating towards the antenna (as in the top-left panel of FIG. 12), the high harmonic phase is:

$$\Phi_{1L} = \Phi_{c,h} - \Phi_{v,1}$$

where $\Phi_{1L}$ is the high harmonic phase in the first half-cycle at the left edge of the antenna, $\Phi_{c,h}$ is the phase of electrons in the conduction band, for propagation towards the high field side, and $\Phi_{v,1}$ is the phase of electrons in the valence band, for propagation towards the low field side. By analogy:

$$\Phi_{2L} = \Phi_{c,1} - \Phi_{v,h}.$$

By symmetry, it follows that $\Phi_{1R}=\Phi_{2L}$, $\Phi_{1L}=\Phi_{2R}$. Furthermore, the dipole changes sign between two successive half-cycles of the driving field. If all four contributions are summed, the following spectrum results:

$$e^{i\Phi_{1L}}e^{in\omega t} + e^{i\Phi_{1R}}e^{in\omega t} - e^{i\Phi_{2L}}e^{in\omega\left(t+\frac{\pi}{\omega}\right)} - e^{i\Phi_{2R}}e^{in\omega\left(t+\frac{\pi}{\omega}\right)} \propto$$
$$\sin\left(\frac{n\pi}{2}\right)(e^{i\Phi_L} + e^{i\Phi_R})$$

where ω is the driving laser frequency. The sum vanishes for n=2m (∀m): no even harmonics are detected. This result comes about from adding the contribution of the opposite side of the antenna. If only contributions from the left side are kept, one obtains:

$$\propto e^{i\Phi_{1L}} - e^{i\Phi_{2L}}e^{in\pi}$$

which is ≠0 for n=2m (∀m).

An estimate of the magnitude of the even harmonics can be obtained by numerical integration of the semi-classical motion of electrons and holes accelerated by the laser field [53, 54]. It is assumed that electrons and holes propagate along the (110) direction in the bands with the smallest effective mass at Γ, between those of $\Gamma_{15}$ (electrons) and $\Gamma_{25}$ (holes)

symmetry at Γ. To simplify the problem, the field is kept constant on the high and low sides, with F=0.1 V/Å in the former and F=0.085 V/Å in the latter. The field strength is in Si, and is reduced from the vacuum strength by the Fresnel transmission coefficients across the air-Al$_2$O$_3$ and Al$_2$O$_3$—Si interface. The lower peak field is obtained by considering the field enhancement gradient of 0.72 nm$^{-1}$ and the max separation between electrons and holes in Si, which amounts to about 3 nm. Once the times of birth and re-collision of electrons and holes are known, the energy of the particles in their respective bands, accumulated between these two times (the semi-classical action), is calculated. Finally, the differences $\Phi_{1L}$ and $\Phi_{2L}$ are computed. They are plotted in FIG. 14.

Figure 14:
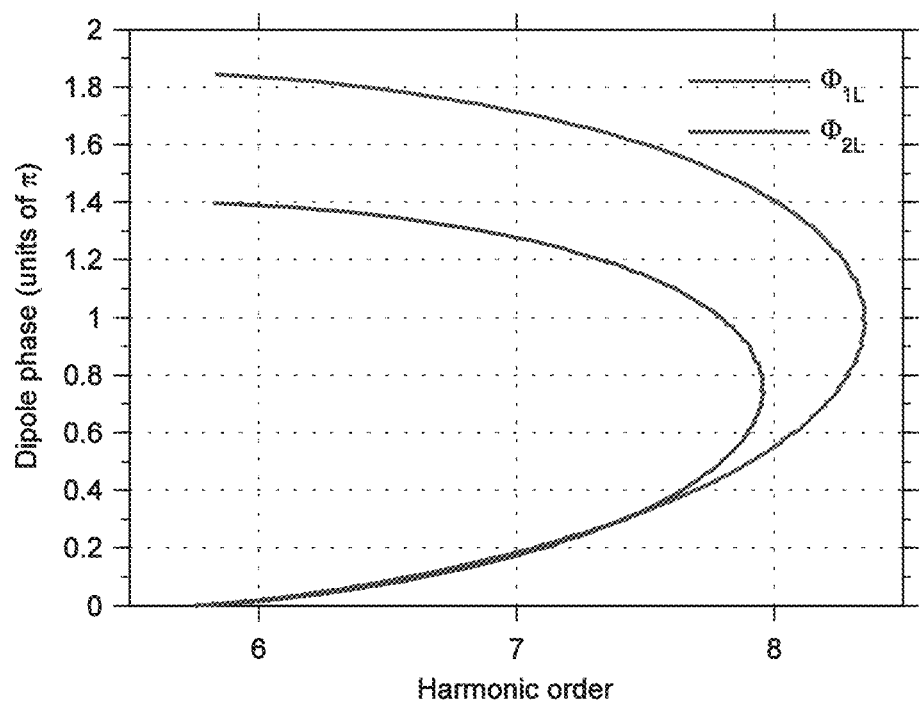
FIG. 14 illustrates a plot of calculated high harmonic dipole phase for electrons (holes) propagating towards (away from) an antenna and vice versa, according to one embodiment of the present invention.

FIG. 14 illustrates a plot of calculated high harmonic dipole phase for electrons (holes) propagating towards (away from) the antenna (red line) and vice versa (blue line). The laser wavelength is λ=2.1 μm and the intensity is 3×10$^{10}$ W/cm$^2$. The difference between $\Phi_{1L}$ and $\Phi_{2L}$ determines the intensity of the even harmonics:

$$I_{2m} \propto \sin^2\left(\frac{\Phi_{1L} - \Phi_{2L}}{2}\right).$$

For short and long trajectory electron-hole pairs, $\Phi_{1L}$-$\Phi_{2L}$ is ~0.45π and ≤0.02 π, corresponding to even harmonic intensities of ~0.42 and ≤0.001 of the nearest odd harmonic. However, for a fundamental laser wavelength of 3.7 μm, the even harmonic intensity from the short trajectories increases to ~3%, which can be easily detected.

Damage to the Nano-Antennas

Figure 15:
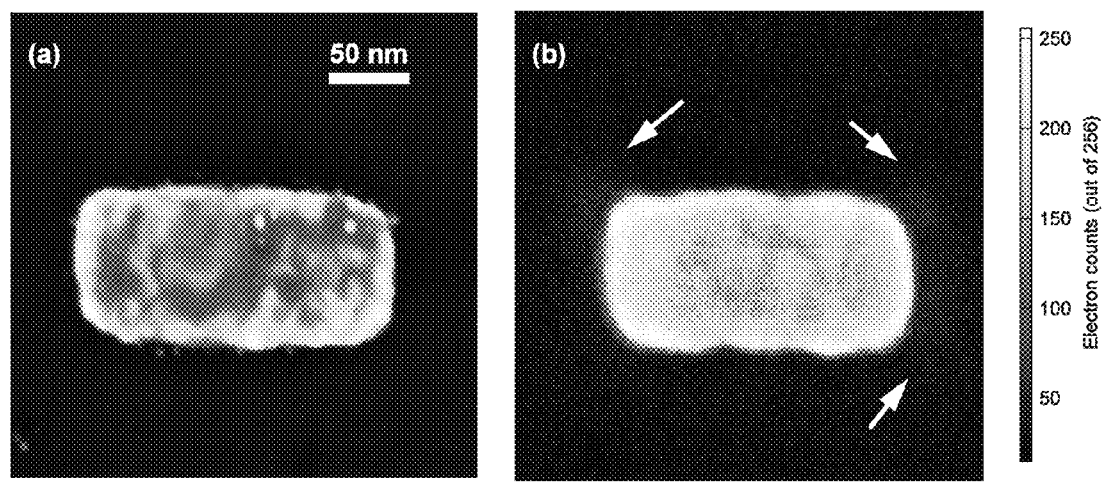
FIG. 15 shows two SEM images acquired before and after illumination, according to one embodiment of the present invention.

FIG. 15 shows two SEM images acquired before (panel a) and after (panel b) illumination. There is no obvious sign of desorption of the antennas from the substrate nor of melting[36, 37]. However, brighter features after exposure are observed just outside the edges of the antenna (marked by the white arrows in panel b), where the field is greatest. These features probably result from imperfect deposition. They are not seen in the before exposure image because the image lacks sufficient dynamic range.

FIG. 11 illustrates imaging for spatial distribution and field enhancement with respect to an antenna, according to one embodiment of the present invention. Accordingly, calculated intensity enhancement (|E|/|E$_{inc}$|)$^2$, where E is the near field of the antenna and E$_{inc}$ is the incident field, 5 nm below the nano-antenna/Si interface for a single Au nano-antenna for polarization parallel (a) and perpendicular (b) to the horizontal axis. The antenna is outlined in yellow. As FIG. 11a shows, a significant part of the field enhancement occurs right below the antenna where dielectric damage is most likely. Unfortunately these regions cannot be seen from the top.

Estimate of the Local Field Enhancement

The measured increase in high harmonic signal when an array is illuminated compared to the emission from an unpatterned area can be used to estimate the actual intensity enhancement near the nano-antennas. According to disclosed embodiments, an enhancement is estimated at a specific depth below the surface, in a unit cell of the periodic pattern of the antennas, with dimensions equal to the pitch plus the antenna size (411×427 nm the instant case). The high harmonic signal emitted from the un-patterned sample scales with the 4$^{th}$ power of the incident intensity:

$$S_{bulk} = \beta I_0^4 \times A L_{abs}$$

where $I_0$ is the incident laser intensity, A is the surface area of the unit cell, and $L_{abs}$ is the absorption length of the harmonic in bulk Si. $AL_{abs}$ is the volume of the emission region. The high harmonic signal emitted from a unit cell of the patterned sample is the addition of the bulk emission everywhere but below the antenna (the Au thickness of 20 nm lets very little light through the antenna) and the inhomogeneous emission from the local field of the antenna. According to the bulk intensity scaling, the local high harmonic emission also scales with the 4$^{th}$ power of the enhanced intensity:

$$S_{enh} = \beta I_0^4 (A-a) L_{abs} + \int dxdy \beta [\alpha(x, y) I_0]^4 z_{enh}$$

Where $a$ is the area of the antenna, $\alpha(x, y)$ is the intensity enhancement factor of the real (rounded) antennas (it would be that of FIG. 11 for perfectly rectangular antennas), and $z_{enh}$ is the depth over which sufficient enhancement is achieved, and the integral is over the unit cell. Evidently, the above estimate is rather crude, as $\alpha(x, y)$ also changes with z.

The contrast between emission from the patterned and un-patterned sample, which is ~10 in the experiment, is then:

$$10 \cong \frac{S_{enh}}{S_{bulk}} = 1 - \frac{a}{A} + \frac{z_{enh}}{AL_{abs}} \int dxdy \alpha(x, y)^4$$

For the ratio to be ~10, the intensity enhancement must be much smaller than that calculated for exactly rectangular antennas (see FIG. 11). To calculate a more realistic enhancement factor, disclosed embodiments approximate the distribution of the real enhancement $\alpha(x, y)$ to that of perfectly rectangular antennas ($\alpha_{rect}(x, y)$) shown in FIG. 11, but renormalized in the following way:

$$\alpha = \epsilon \frac{\alpha_{rect} - 1}{\max\{\alpha_{rect}\}} + 1$$

The renormalized α peaks at the value ϵ and equals 1 (no enhancement) at the same positions as $\alpha_{rect}$. In select embodiments, ϵ≅7–13 for $$1/6 < \frac{z_{enh}}{L_{abs}} < 1.$$

Furthermore, the absorption length of Si ranges between approximately 7 nm at 5.6 eV and 66 nm at 31 eV [S6]. As a result, the high harmonic emission density, proportional to the fourth power of the enhanced intensity, increases between ~2500-10000 times.

One can calculate an effective area of emission, assuming it is uniform, by approximating $\alpha(x, y) = \epsilon$:

$$10 \cong 1 - \frac{a}{A} + \epsilon^4 \frac{z_{enh}}{L_{abs}} \frac{A_{eff}}{A}$$

Accordingly, $L_{eff} = \sqrt{A_{eff}}/2 \cong 15 - 18$ nm for $$\frac{z_{enh}}{L_{abs}} = \frac{1}{6}$$

and 1 respectively. The factor of 2 in the denominator of the square root takes into account that there are two equivalent emission regions on either side of the antenna.

One disclosed embodiment of the present invention provides a method for measuring the time-dependent field of an optical pulse such as, for example, a laser pulse, if the optical pulse is used as the perturbing electric field, i.e., the control field is another optical pulse. The field of the optical pulse can then be measured by the measurements of emitted harmonics. To date, only one alternative method can perform a similar action, but it is much slower, operationally more expensive requiring instruments such as, for example, vacuum chambers and electron energy analyzers more expensive, and requires approximately hundred to a thousand times more laser energy. On the other hand, a device based on a silicon generation medium will be compact, cheap, fast (possibly even capable of measuring single pulses) and will require much less laser power. No other methods currently exist that can measure the electric field of light pulses. The silicon device will find utility in application requiring generation of short laser pulses. Additionally, measuring the electric field of the light will be increasingly relevant for the telecommunication industry with growth towards optical communication and transport.

Figure 7:
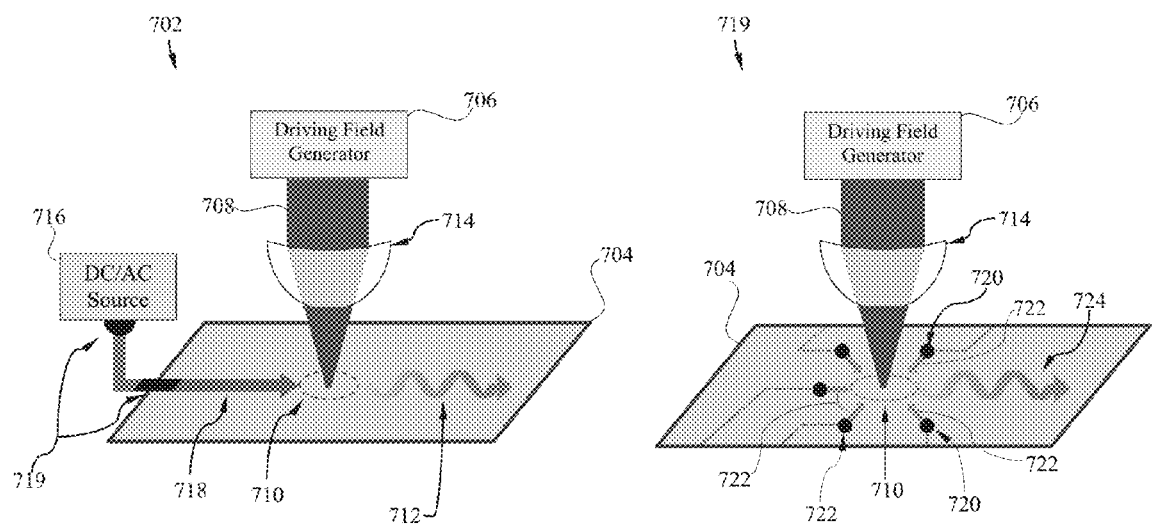
FIG. 7 is a schematic illustration of exemplary apparatus for tunable generation of high-order harmonics in silicon-based devices and systems, according to one embodiment of the present invention.

One disclosed embodiment of the present invention provides a method and apparatus based on controlled generation of high-harmonic radiations with tunable spatial and temporal characteristics. Turning to FIG. 7, an exemplary silicon-based apparatus 702 for tunable generation of high-order harmonics is illustrated. Silicon-based apparatus 702 comprises a silicon generation medium 704 and driving field generator 706 configured to apply a driving electromagnetic field 708, to an interaction region 710 of the silicon generation medium 704 to thereby initiate a high harmonic generation process therein. Thus causing the silicon generation medium 704 to emit a harmonic beam 712. A lens 714 may be used for focusing the driving electromagnetic field 708 onto the interaction region 710 of the silicon generation medium 704. The exemplary silicon-based apparatus 702 further comprises a control field generator 716 that may be configured to apply a control field 718, such as via one or more external terminals 719, onto the interaction region 710 of the silicon generation medium 704 for controlled interference with the driving electromagnetic field 708. The control field 718 may comprise a spatially inhomogeneous field applied over a one or two dimensional array of electrodes with all electrodes switched together or in any combination, including individually. The switching speed can be of any rise time and duration that is consistent with electronic or optoelectronic switches including durations of 100 fs to 100 ps or 1 ns to 1 ps or 1 microsecond to one nanosecond. In cases where the fundamental field is applied periodically, the control field may also be applied periodically so as to add sidebands to the high harmonic signal. This will enable the tuning of spectral, temporal and spatial properties of the harmonic beam 712.

An alternative embodiment, represented by exemplary apparatus 719 in FIG. 7, disclose a configuration that differs from that of apparatus 702 in the related structure and method associated with the generation and application of the control field to the interaction region 710 of the silicon generation medium 704, for the purpose of controlling the high harmonic generation process. Exemplary apparatus 719 utilizes one or more internal terminals 720 to produce and apply a control field 722 to the silicon interaction region 710 in order to exert control over the high harmonic generation process. Similar to the exemplary scenario described above, this will enable the tuning of spectral, temporal and spatial properties of the harmonic beam 724 through controlled interference with the driving electromagnetic field 708.

One exemplary implementation of internal terminals discloses a configuration wherein the surface of the silicon generation medium maybe patterned with thin electrodes that convey DC or AC fields into the interaction region of the silicon generation medium to interact with the intense ionizing pulse (i.e. driving electromagnetic field) to thereby suitably modify the propagation of the generated harmonics.

Thus, disclosed embodiments provide a control field that may comprise DC, AC or pulsed electrical signals that may be applied through external or internal terminals as illustrated respectively by exemplary embodiments 704 and 719 in FIG. 7. The employed configuration of the disclosed invention presents an extremely powerful and convenient method to control harmonic light to use, for example, for probing other systems and/or implementing functionalities such as, for example, focusing/defocusing, raster scanning and beam splitting. Although conventional optical mirrors are available to steer visible light, vacuum-ultraviolet radiation requires costly solutions. Furthermore, each mirror is often designed to perform one single operation such as, for example, specular reflection, focusing, beam splitting. In contrast, the disclosed method and apparatus arrangement, according to select disclosed embodiments, may perform multiple tasks at once. For example the combination can include a beam splitter, a frequency shifter, spectral selector, or a mode converter.

One disclosed embodiment of the present invention provides a laser source delivering ultraviolet frequency comb by means of high-harmonic generation in a silicon substrate. Controlling the spectral properties of the laser beam enables tuning the period of the harmonic frequency comb, thus offering operational flexibility. Furthermore, due to the low laser energy required to produce the harmonics, nano-antennas deposited directly on the silicon substrate may further reduce the threshold to laser intensities available with laser frequency combs. Much effort has been devoted to produce soft X-ray frequency combs with high-harmonic generation in gases. The methods disclosed in accordance to one aspect of the present invention enable the generation of optical, ultraviolet and vacuum ultraviolet frequency comb directly in a silicon medium. This opens the possibility of co-integration of an ultra-precise metrology and diagnostic functionalities with optical, electronic and microfluidic components monolithically fabricated in a single microsystem.

One disclosed embodiment of the present invention enables monolithic integration of ultra-precise UV spectroscopic functionality with micro fluidics and lab-on-chip components. All documents, patents, journal articles and other materials cited in the present application are incorporated herein by reference.

Having described the various embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

REFERENCES

The following references are referred to above and/or describe technology that may be used with the present invention and contents and disclosure of the following references are incorporated herein by reference:

1. L. Keldysh, Sov. Phys. JETP 20, 1307 (1965).
2. P. B. Corkum and F. Krausz, Nature Physics 3, 381 (2007).
3. S. Ghimire, A. D. DiChiara, E. Sistrunk, P. Agostini, L. F. DiMauro and D. A. Reis, Nature Phys. 7, 138 (2011).
4. G. Vampa, T. J. Hammond, N. Thire, F. Legare, C. R. McDonald, T. Brabec and P. B. Corkum, Nature 522, 462-464 (2015).
5. M. Schultze, et al., Science 346, 1348-1352 (2015).
6. K. A. Pronin, A. D. Bandrauk and A. A. Ovchinnikov, Phys. Rev. B 50, 3473(R) (1994).
7. G. Vampa, C. R. McDonald, G. Orlando, D. D. Klug, P. B. Corkum, and T. Brabec, Phys. Rev. Lett. 113, 073901 (2014).
8. M. Wu, S. Ghimire, D. A. Reis, K. J. Schafer and M. B. Gaarde, Phys. Rev. A 91, 043839 (2015).
9. M. Hohenleutner, F. Langer, O. Schubert, M. Knorr, U. Huttner, S. W. Koch and R. Huber, Nature 523, 572-575 (2015).
10. P. G. Hawkins, M. Yu. Ivanov and V. S. Yakovlev Phys. Rev. A 91, 013405 (2015).
11. Semiconductors on NSM website.
12. N. Dudovich, O. Smirnova, J. Levesque, Y. Mairesse, M. Yu Ivanov, D. M. Villeneuve and P. B. Corkum, Nature Physics 2, 781 (2006).
13. X. He, J. M. Dahlstrom, R. Rakowski, C. M. Heyl, A. Persson, J. Mauritsson and A. L'Huillier, Phys. Rev. A 82, 033410 (2010).
14. G. E. Jellison, Optical Materials 1, 41-47 (1992).
15. J. M. Dahlstrom, A. L'Huillier and J. Mauritsson, J. Phys. B: At. Mol. Opt. Phys. 44, 095602 (2011).
16. B. A. Ruzicka, L. K. Werake, G. Xu, J. B. Khurgin, E. Y. Sherman, J. Z. Wu and H. Zhao, Phys. Rev. Lett. 108, 077403 (2012).
17. O. Smirnova, Y. Mairesse, S. Patchkovskii, N. Dudovich, D. M. Villeneuve, P. B. Corkum and M. Yu Ivanov, Nature 460, 972-977 (2009).
18. A. Rickman, Nature Photonics 8, 579-582 (2014).
19. Stockman, M. I. Nanoplasmonics: The physics behind the applications. *Phys. Today* 64, 39-44 (2011).
20. Kim, S. et al. High-harmonic generation by resonant plasmon field enhancement. Nature 453, 757-760 (2008).
21. Park, I-Y. et al. Plasmonic generation of ultrashort extreme-ultraviolet light pulses. Nature Photonics 5, 677-681 (2011).
22. Park I-Y. et al. Generation of EUV radiation by plasmonic field enhancement using nano-structured bowties and funnel-waveguides, Ann Phys. 525, 87-96 (2013).
23. Sivis, M. et al. Nanostructure-enhanced atomic line emission. Nature 485, E1-E3 (2012).
24. Sivis, M. et al. Extreme-ultraviolet light generation in plasmonic nanostructures. Nature Physics 9, 304-309 (2013).
25. Raschke, M. B. High⎵harmonic generation with plasmonics: feasible or unphysical? Annalen der Physik 525, A40-A42 (2013).
26. Feist, J., Homer Reid, M. T. and Kling, M. F. Nanoplasmonic near-field synthesis. Physical Review A 87, 033816 (2013).
27. Stewart, Matthew E., et al. Nanostructured plasmonic sensors. Chemical reviews 108, 494-521 (2008).
28. Cingöz, A. et al. Direct frequency comb spectroscopy in the extreme ultraviolet. Nature 482, 68-71 (2012).
29. Corkum, P. B., and Krausz, F. Attosecond science. Nature Physics 3, 381-387 (2007).
30. Pfeifer, T., Spielmann, C. and Gerber, G. Femtosecond x-ray science. Reports on Progress in Physics 69, 443 (2006).
31. Luu, T. T. et al. Extreme ultraviolet high-harmonic spectroscopy of solids. Nature 521, 498-502 (2015).
32. Schubert, O. et al. Sub-cycle control of terahertz high-harmonic generation by dynamical Bloch oscillations. Nature Photonics 8, 119-123 (2014).
33. Ghimire, S. et al. Observation of high-order harmonic generation in a bulk crystal. Nature physics 7, 138-141 (2011).
34. Vampa, G. et al. Generation of high harmonics from silicon. arXiv preprint arXiv:1605.06345 (2016).
35. Boyd, R. W. Nonlinear optics. Academic press, 2003.
36. Pfullmann, N. et al. Bow-tie nano-antenna assisted generation of extreme ultraviolet radiation. New journal of Physics 15, 093027 (2013).
37. Pfullmann, N. et al. Nano-antenna-assisted harmonic generation. Applied Physics B 113, 75-79 (2013).
38. Guler, U., Shalaev, V. M. and Boltasseva, A. Nanoparticle plasmonics: going practical with transition metal nitrides. Materials Today 18, 227-237 (2015).
39. Barwick, B., Flannigan, D. J. and Zewail, A. H. Photon-induced near-field electron microscopy. Nature 462, 902-906 (2009).
40. Kawata, S., Inouye, Y. and Verma, P. Plasmonics for near-field nano-imaging and superlensing. Nature Photonics 3, 388-394 (2009).
41. Zhang, B. et al. High contrast 3D imaging of surfaces near the wavelength limit using tabletop EUV ptychography. Ultramicroscopy 158, 98-104 (2015).
42. Chapman, H. N. et al. Femtosecond diffractive imaging with a soft-X-ray free-electron laser. Nature Physics 2, 839-843 (2006).
43. Förg, B. et al. Attosecond nanoscale near-field sampling. Nature communications 7, (2016).
44. Kim, K. T. et al. Petahertz optical oscilloscope. Nature Photonics 7, 958-962 (2013).
45. Dudovich, N., et al. Measuring and controlling the birth of attosecond XUV pulses. Nature physics 2, 781-786 (2006).
46. Vampa, G. et al. Linking high harmonics from gases and solids. Nature 522, 462-464 (2015).
47. Ciappina, M. F. et al. High-order-harmonic generation from inhomogeneous fields. Physical Review A 85, 033828 (2012).
48. Yu, N. and Capasso, F. Flat optics with designer meta-surfaces. Nature materials 13, 139-150 (2014).
49. Barbry, M. et al. Atomistic near-field nanoplasmonics: Reaching atomic-scale resolution in nanooptics. Nano letters 15, 3410-3419 (2015).
50. http://www.mtixtl.com/sossiliconsapphire-2.aspx 51. B. G. Ghamsari, A. Olivieri, F. Variola, and P. Berini, Enhanced Raman scattering in graphene by plasmonic resonant Stokes emission, Nanophotonics, vol 3, no. 6, 363-371, December 2014.
52. Mousavi S. S., Berini P, McNamara D. Periodic plasmonic nanoantennas in a piecewise homogeneous background. Optics Express 2012; 20:18044-65.
53. Vampa, G., et al. "Theoretical analysis of high-harmonic generation in solids." *Physical review letters* 113.7 (2014): 073901.
54. Vampa, G., et al. "Semiclassical analysis of high harmonic generation in bulk crystals." *Physical Review B* 91.6 (2015): 064302.
55. E. D. Palik, *Handbook of Optical Constants of Solids* (Academic Press, San Diego, 1998), Vol. 1, pp. 571-586.

What is claimed is:

1. A method comprising:
applying a driving electromagnetic field to a silicon medium to thereby cause the silicon medium to emit a harmonic beam; and
applying a control field to the driving electromagnetic field in an interaction region of the silicon medium to thereby control one or more properties of the harmonic beam,
wherein the driving electromagnetic field has a first frequency and the harmonic beam comprises a plurality of high-order harmonics of the first frequency,
wherein the control field has a second frequency that is a second harmonic of the first frequency, and
wherein the one or more properties of the harmonic beam consist of spectral, temporal and spatial properties.

2. The method of claim 1, wherein the method comprises varying an intensity of the control field to modulate a spectrum of the harmonic beam.

3. The method of claim 1, wherein the method comprises varying a relative phase between the control field and the driving electromagnetic field as a function of a harmonic order to thereby modulate an intensity of the harmonic order in the harmonic beam.

4. The method of claim 1, wherein the control field comprises a laser field.

5. The method of claim 1, wherein the control field comprises a DC field.

6. The method of claim 1, wherein the control field comprises an AC field.

7. The method of claim 1, wherein the control field comprises a pulsed electrical signal.

8. The method of claim 1, wherein the driving electromagnetic field comprises a laser field.

9. The method of claim 1, wherein the applied control field is an optically applied electromagnetic field.

10. The method of claim 1, wherein the harmonic beam comprises one or more high harmonics that are in a mid-infrared to ultraviolet frequency regime.

11. The method of claim 1, wherein a frequency comb is impressed on high harmonic radiation or on isolated ultrashort pulses generated by electron-hole recollision.

12. The method of claim 11 comprising tuning a period of the ultraviolet frequency comb by controlling one or more spectral properties of the short intent laser pulse.

13. The method of claim 11 wherein, light intensity required to produce the ultraviolet frequency comb is reduced through the use of one or more nano-antennas deposited directly on the silicon medium.

14. An apparatus comprising:
a silicon generation medium;
a driving field generator configured to apply a driving electromagnetic field to the silicon generation medium to thereby cause the silicon generation medium to emit a harmonic beam; and
a control field generator configured to apply a control field to the driving electromagnetic field in an interaction region of the silicon generation medium to thereby control one or more properties of the harmonic beam,
wherein the driving electromagnetic field has a first frequency and the harmonic beam comprises a plurality of high-order harmonics of the first frequency,
wherein the control field has a second frequency that is a second harmonic of the first frequency, and
wherein the one or more properties of the harmonic beam consist of spectral, temporal and spatial properties.

15. The apparatus of claim 14, wherein control field generator comprises one or more internal terminals on a surface of the silicon generation medium.

16. The apparatus of claim 14, wherein the control field generator comprises one or more external terminals.

17. The apparatus of claim 14, wherein the control field comprises a laser field.

18. The apparatus of claim 14, wherein the control field comprises a DC field.

19. The apparatus of claim 14, wherein the control field comprises an AC field.

20. The apparatus of claim 14, wherein the control field comprises a pulsed electrical signal.

21. The apparatus of claim 14, wherein the driving electromagnetic field comprises a laser field.

22. The apparatus of claim 14, wherein the control field is an optically applied electromagnetic field.

23. The apparatus of claim 14, wherein the harmonic beam comprises one or more high harmonics that are in a mid-infrared to ultraviolet frequency regime.

24. The apparatus of claim 14 wherein, one or more nano-antennas are deposited directly on the silicon generation medium.

* * * * *